United States Patent
Kim et al.

(10) Patent No.: US 10,212,441 B2
(45) Date of Patent: *Feb. 19, 2019

(54) METHOD AND APPARATUS FOR PROCESSING VIDEO

(71) Applicant: CHIPS & MEDIA, INC., Seoul (KR)

(72) Inventors: Hyun Gyu Kim, Seoul (KR); Sang Chol Lee, Seoul (KR); Shin Hyuk Choi, Seoul (KR)

(73) Assignee: CHIPS & MEDIA, INC., Seoul (KR)

( * ) Notice: Subject to any disclaimer, the term of this patent is extended or adjusted under 35 U.S.C. 154(b) by 131 days.

This patent is subject to a terminal disclaimer.

(21) Appl. No.: 15/116,389

(22) PCT Filed: Feb. 12, 2014

(86) PCT No.: PCT/KR2014/001156
§ 371 (c)(1),
(2) Date: Aug. 3, 2016

(87) PCT Pub. No.: WO2015/122549
PCT Pub. Date: Aug. 20, 2015

(65) Prior Publication Data
US 2017/0013269 A1 Jan. 12, 2017

(51) Int. Cl.
*H04N 19/436* (2014.01)
*H04N 19/13* (2014.01)
(Continued)

(52) U.S. Cl.
CPC ............ *H04N 19/436* (2014.11); *G06T 1/20* (2013.01); *H04N 19/13* (2014.11);
(Continued)

(58) Field of Classification Search
CPC .... H04N 19/436; H04N 19/13; H04N 19/174; H04N 19/70; G06T 1/20; G06T 2200/28
See application file for complete search history.

(56) References Cited

U.S. PATENT DOCUMENTS 5,856,975 A * 1/1999 Rostoker ............... G06F 13/128
348/467
9,319,692 B2 * 4/2016 Henry .................... H04N 19/13
(Continued)

FOREIGN PATENT DOCUMENTS

KR    10-0752846 B1    8/2007
KR    10-2012-0082375 A    7/2012
(Continued)

*Primary Examiner* — Nhon T Diep
(74) *Attorney, Agent, or Firm* — Novick, Kim & Lee, PLLC; Sang Ho Lee

(57) ABSTRACT

The present invention relates to a method for processing a video, comprising: a step in which a video central processing unit communicates with a host, receives a bitstream, parses header information, and generates a plurality of tasks for parallel processing; a step in which free scan information is generated by a free scan of a video bitstream inputted from the host according to the control of the video central processing unit; and a step in which a plurality of video processing units process the plurality of tasks on the basis of the free scan information and the parsed header information by receiving the control of the video central processing unit.

19 Claims, 21 Drawing Sheets

(51) Int. Cl.
*H04N 19/174* (2014.01)
*H04N 19/70* (2014.01)
*G06T 1/20* (2006.01)

(52) U.S. Cl.
CPC ........... *H04N 19/174* (2014.11); *H04N 19/70* (2014.11); *G06T 2200/28* (2013.01)

(56) References Cited

U.S. PATENT DOCUMENTS

| | | | |
|---|---|---|---|
| 9,628,792 B2* | 4/2017 | Rapaka | H04N 19/136 |
| 9,736,489 B2* | 8/2017 | Wang | H04N 19/52 |
| 9,930,368 B2* | 3/2018 | Schierl | H04N 19/91 |
| 2006/0028359 A1* | 2/2006 | Kim | H03M 7/40 |
| | | | 341/50 |
| 2014/0003532 A1* | 1/2014 | Coban | H04N 19/463 |
| | | | 375/240.24 |

FOREIGN PATENT DOCUMENTS

| | | |
|---|---|---|
| WO | 2013/109115 A1 | 7/2013 |
| WO | 2013/115560 A1 | 8/2013 |
| WO | 2013/157796 A1 | 10/2013 |

\* cited by examiner

| seq_parameter_set_rbsp( ) { | Descriptor |
|---|---|
| sps_video_parameter_set_id | u(4) |
| sps_max_sub_layers_minus1 | u(3) |
| sps_temporal_id_nesting_flag | u(1) |
| profile_tier_level( sps_max_sub_layers_minus1 ) | |
| sps_seq_parameter_set_id | ue(v) |
| chroma_format_idc | ue(v) |
| if( chroma_format_idc == 3 ) | |
|    separate_colour_plane_flag | u(1) |
| pic_width_in_luma_samples | ue(v) |
| pic_height_in_luma_samples | ue(v) |
| conformance_window_flag | u(1) |
| if( conformance_window_flag ) { | |
|    conf_win_left_offset | ue(v) |
|    conf_win_right_offset | ue(v) |
|    conf_win_top_offset | ue(v) |
|    conf_win_bottom_offset | ue(v) |
| } | |
| bit_depth_luma_minus8 | ue(v) |
| bit_depth_chroma_minus8 | ue(v) |
| log2_max_pic_order_cnt_lsb_minus4 | ue(v) |
| sps_sub_layer_ordering_info_present_flag | u(1) |
| for( i = ( sps_sub_layer_ordering_info_present_flag ? 0 : sps_max_sub_layers_minus1 );<br>   i <= sps_max_sub_layers_minus1; i++ ) { | |
|    sps_max_dec_pic_buffering_minus1[ i ] | ue(v) |
|    sps_max_num_reorder_pics[ i ] | ue(v) |
|    sps_max_latency_increase_plus1[ i ] | ue(v) |
| } | |
| log2_min_luma_coding_block_size_minus3 | ue(v) |
| log2_diff_max_min_luma_coding_block_size | ue(v) |
| log2_min_transform_block_size_minus2 | ue(v) |
| log2_diff_max_min_transform_block_size | ue(v) |
| max_transform_hierarchy_depth_inter | ue(v) |
| max_transform_hierarchy_depth_intra | ue(v) |
| scaling_list_enabled_flag | u(1) |

FIG. 6

| | |
|---|---|
| if( scaling_list_enabled_flag ) { | |
|    sps_scaling_list_data_present_flag | u(1) |
|    if( sps_scaling_list_data_present_flag ) | |
|       scaling_list_data( ) | |
| } | |
| amp_enabled_flag | u(1) |
| sample_adaptive_offset_enabled_flag | u(1) |
| pcm_enabled_flag | u(1) |
| if( pcm_enabled_flag ) { | |
|    pcm_sample_bit_depth_luma_minus1 | u(4) |
|    pcm_sample_bit_depth_chroma_minus1 | u(4) |
|    log2_min_pcm_luma_coding_block_size_minus3 | ue(v) |
|    log2_diff_max_min_pcm_luma_coding_block_size | ue(v) |
|    pcm_loop_filter_disabled_flag | u(1) |
| } | |
| num_short_term_ref_pic_sets | ue(v) |
| for( i = 0; i < num_short_term_ref_pic_sets; i++) | |
|    short_term_ref_pic_set( i ) | |
| long_term_ref_pics_present_flag | u(1) |
| if( long_term_ref_pics_present_flag ) { | |
|    num_long_term_ref_pics_sps | ue(v) |
|    for( i = 0; i < num_long_term_ref_pics_sps; i++) { | |
|       lt_ref_pic_poc_lsb_sps[ i ] | u(v) |
|       used_by_curr_pic_lt_sps_flag[ i ] | u(1) |
|    } | |
| } | |
| sps_temporal_mvp_enabled_flag | u(1) |
| strong_intra_smoothing_enabled_flag | u(1) |
| vui_parameters_present_flag | u(1) |
| if( vui_parameters_present_flag ) | |
|    vui_parameters( ) | |
| sps_extension_flag | u(1) |
| if( sps_extension_flag ) | |
|    while( more_rbsp_data( ) ) | |
|       sps_extension_data_flag | u(1) |
| rbsp_trailing_bits( ) | |
| } | |

FIG. 7

| pic_parameter_set_rbsp( ) { | Descriptor |
|---|---|
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   num_extra_slice_header_bits | u(3) |
|   sign_data_hiding_flag | u(1) |
|   cabac_init_present_flag | u(1) |
|   num_ref_idx_l0_default_active_minus1 | ue(v) |
|   num_ref_idx_l1_default_active_minus1 | ue(v) |
|   init_qp_minus26 | se(v) |
|   constrained_intra_pred_flag | u(1) |
|   transform_skip_enabled_flag | u(1) |
|   cu_qp_delta_enabled_flag | u(1) |
|   if( cu_qp_delta_enabled_flag ) | |
|     diff_cu_qp_delta_depth | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   transquant_bypass_enabled_flag | u(1) |
|   tiles_enabled_flag | u(1) |
|   entropy_coding_sync_enabled_flag | u(1) |
|   if( tiles_enabled_flag ) { | |
|     num_tile_columns_minus1 | ue(v) |
|     num_tile_rows_minus1 | ue(v) |
|     uniform_spacing_flag | u(1) |
|     if( !uniform_spacing_flag ) { | |
|       for( i = 0; i < num_tile_columns_minus1; i++ ) | |
|         column_width_minus1[ i ] | ue(v) |
|       for( i = 0; i < num_tile_rows_minus1; i++ ) | |
|         row_height_minus1[ i ] | ue(v) |
|     } | |
|     loop_filter_across_tiles_enabled_flag | u(1) |
|   } | |

FIG. 8

| | |
|---|---|
| loop_filter_across_slices_enabled_flag | u(1) |
| deblocking_filter_control_present_flag | u(1) |
| if( deblocking_filter_control_present_flag ) { | |
|    deblocking_filter_override_enabled_flag | u(1) |
|    pps_deblocking_filter_disabled_flag | u(1) |
|    if( !pps_deblocking_filter_disabled_flag ) { | |
|       pps_beta_offset_div2 | se(v) |
|       pps_tc_offset_div2 | se(v) |
|    } | |
| } | |
| pps_scaling_list_data_present_flag | u(1) |
| if( pps_scaling_list_data_present_flag ) | |
|    scaling_list_data( ) | |
| lists_modification_present_flag | u(1) |
| log2_parallel_merge_level_minus2 | ue(v) |
| slice_segment_header_extension_present_flag | u(1) |
| pps_extension_flag | u(1) |
| if( pps_extension_flag ) | |
|    while( more_rbsp_data( ) ) | |
|       pps_extension_data_flag | u(1) |
| rbsp_trailing_bits( ) | |
| } | |

FIG. 9

| slice_segment_header( ) { | Descriptor |
|---|---|
|   first_slice_segment_in_pic_flag | u(1) |
|   if( nal_unit_type >= 16 && nal_unit_type <= 23 ) /* IRAP picture */ | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { /* Not an IDR picture */ | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |
|       if( sps_temporal_mvp_enabled_flag ) | |
|         slice_temporal_mvp_enabled_flag | u(1) |

FIG. 10

| | |
|---|---|
| } | |
| if( sample_adaptive_offset_enabled_flag ) { | |
|   slice_sao_luma_flag | u(1) |
|   slice_sao_chroma_flag | u(1) |
| } | |
| if( slice_type == P \|\| slice_type == B ) { | |
|   num_ref_idx_active_override_flag | u(1) |
|   if( num_ref_idx_active_override_flag ) { | |
|     num_ref_idx_l0_active_minus1 | ue(v) |
|     if( slice_type == B ) | |
|       num_ref_idx_l1_active_minus1 | ue(v) |
|   } | |
|   if( lists_modification_present_flag && NumPocTotalCurr > 1 ) | |
|     ref_pic_lists_modification( ) | |
|   if( slice_type == B ) | |
|     mvd_l1_zero_flag | u(1) |
|   if( cabac_init_present_flag ) | |
|     cabac_init_flag | u(1) |
|   if( slice_temporal_mvp_enabled_flag ) { | |
|     if( slice_type == B ) | |
|       collocated_from_l0_flag | u(1) |
|     if( ( collocated_from_l0_flag && num_ref_idx_l0_active_minus1 > 0 ) \|\| | |
|       ( !collocated_from_l0_flag && num_ref_idx_l1_active_minus1 > 0 ) ) | |
|       collocated_ref_idx | ue(v) |
|   } | |
|   if( ( weighted_pred_flag && slice_type == P ) \|\| | |
|     ( weighted_bipred_flag && slice_type == B ) ) | |
|     pred_weight_table( ) | |
|   five_minus_max_num_merge_cand | ue(v) |
| } | |
| slice_qp_delta | se(v) |
| if( pps_slice_chroma_qp_offsets_present_flag ) { | |
|   slice_cb_qp_offset | se(v) |
|   slice_cr_qp_offset | se(v) |
| } | |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( loop_filter_across_slices_enabled_flag && | |
|   ( slice_sao_luma_flag \|\| slice_sao_chroma_flag \|\| | |
|   !slice_deblocking_filter_disabled_flag ) ) | |
|   slice_loop_filter_across_slices_enabled_flag | u(1) |
| } | |
| if( tiles_enabled_flag \|\| entropy_coding_sync_enabled_flag ) { | |

FIG. 11

| | |
|---|---|
| num_entry_point_offsets | ue(v) |
| if( num_entry_point_offsets > 0 ) { | |
|   offset_len_minus1 | ue(v) |
|   for( i = 0; i < num_entry_point_offsets; i++ ) | |
|     entry_point_offset_minus1[ i ] | u(v) |
|   } | |
| } | |
| if( slice_segment_header_extension_present_flag ) { | |
|   slice_segment_header_extension_length | ue(v) |
|   for( i = 0; i < slice_segment_header_extension_length; i++ ) | |
|     slice_segment_header_extension_data_byte[ i ] | u(8) |
| } | |
| byte_alignment( ) | |
| } | |

FIG. 12

METHOD AND APPARATUS FOR PROCESSING VIDEO

TECHNICAL FIELD

The present disclosure relates to a method and apparatus for processing videos, and in particular to a method and apparatus for processing videos in such a way to use a plurality of processing units.

BACKGROUND ART

As the needs for the UHD (Ultra High Definition) video increase, the size of a storing medium and the bandwidth of a transfer medium cannot be satisfied based on the current MPEG (Moving Picture Expert Group) technology, which means that a new video coding technology, which is able to code the UHD video, is necessary. To resolve this problem, the HEVC (High Efficiency Video Coding) was standardized in January, 2013.

However, the HEVC can be employed for the sake of a video stream which is currently being provided via the internet, 3G, LTE, etc. The HEVC is able to code the UHD video as well as the FHD (Full High Definition) or HD videos into the form of a HEVC file.

It is expected that the UHD TV will be designed to operate at 4K 30 fts, but the number of pixels which should be processed per second might increase like 4K 60 fps/120 fps, 8K 30 fps/60 fps, . . . , etc.

In order to cost-effectively cope with various resolutions and frame rates due to the changing applications, it needs to provide a video decoder unit which is able to easily carry out the performance, function, etc. which are required by the applications.

For the sake of the above-mentioned applications, a predetermined video processing method may be employed, which can be carried out based on a parallel processing method using a plurality of processing units. In case of the parallel processing method using a plurality of the processing units, a split bitstream may be assigned to each of the processing units, thus carrying out a decoding process.

However, if the above-mentioned parallel processing method is simply employed, a predetermined unbalancing situation may occur between the processing units. Moreover, the efficiency of the bandwidth may be degraded due to such an unbalance. A predetermined disadvantage may occur in terms of the configuration of a hardware.

In particular, if coding units (for example, a tile, a slice, etc.) having different sizes exist in one pixel, the time that the tiles or slices assigned to each processing unit are decoded may differ. For this reason, even though a multi-decoding process is carried out using a plurality of the processing units, the processing time of each processing unit may differ, which may cause a problem wherein the whole decoding time synchronization may not be carried out, and otherwise it is hard to predict the whole decoding time synchronization, which consequently may result in the increased inefficiency.

Meanwhile, the coding and decoding methods based on the WPP (Wavefront Parallel Processing) method may be proposed for the sake of the parallel decoding method using a plurality of processing units. This method, however, may has a problem wherein in order for the parallel decoding process to be carried out using a plurality of the processing units during the decoding process, a WPP format information should be written in header information of the bitstream during the coding process due to its natural structure in case of the HEVC standardization method which is currently available, whereby the applicable range thereof may be limited.

Moreover, according to the ordinary WPP processing method, except for the above-described unbalancing problem, another problem may occur during a processing order allocation with respect to each processing unit. The outputs should be synchronized based on the unit of the pictures for the sake of a normal video playback, whereby the decoding process can be carried out, wherein the outputs are synchronized based on the unit of the pictures. For this reason, a part of the processing units should inevitably standby for the sake of synchronization, whereupon the latency may increase during the decoding process, and the whole decoding time may increase.

DISCLOSURE OF INVENTION

Technical Problem

Accordingly, an object of the present invention is to provide an apparatus and method for processing videos, wherein the apparatus therefor is equipped with a VPU (Video Processing Unit) in a multi core structure.

Solution to Problem

Accordingly, in one aspect, the present invention provides a device for processing videos, which may include, but is not limited to, a video central processing unit which is able to communicate with a host and is provided to receive a bitstream and parse header information and is able to generate a plurality of tasks for the sake of parallel processing; a prescan module which is provided to generate prescan information in such a way to prescan a video bitstream inputted from the host according to the control of the video central processing unit; and a plurality of video processing units which are provided to process a plurality of the tasks based on the parsed header information and the prescan information in accordance with a control of the video central processing unit.

In another aspect, the present invention provides a method for processing videos, which may include, but is not limited to, a step in which a video central processing unit communicates with a host, receives a bitstream, parses header information, and generates a plurality of tasks for parallel processing; a step in which prescan information is generated by a prescan of a video bitstream inputted from the host according to the control of the video central processing unit; and a step in which a plurality of video processing units process the plurality of tasks on the basis of the prescan information and the parsed header information by receiving the control of the video central processing unit.

In further another aspect, the method for processing videos according to the present invention may be implemented by a recording medium which includes a program executed by a computer and is readable by the computer.

Advantageous Effects

According to an embodiment of the present invention, a plurality of the processing units are able to carry out a seamless parallel processing based on prescan information generated by a prescan module even though the information is split and allocated into the unit of a predetermined segment irrespective of the structure of a bitstream.

In particular, the prescan module is able to extract and store minimum information which is essential for each core to seamlessly carry out an entropy decoding by scanning the bitstream.

In this way, any unbalance the processing performances of a plurality of the processing units can be removed, and it is possible to inhibit the decrease in a bandwidth efficiency which might occur due to the unbalance.

Furthermore, in a video central processing unit, each processing unit is able to carry out a seamless parallel process using prescan information, by means of which a bitstream processing sequence can be efficiently aligned, and the decoding time can be reduced.

Moreover, the video central processing unit is able to generate and allocate an appropriate task in response to each processing unit. The bitstream processing rate can be enhanced in such a way to asynchronously control a prescan and a realignment in response to a processing state of each picture and a process completion time in response to a decoding process, and the overhead of the data can be decreased, and the latency can be reduced.

Moreover, the multi-core decoding process can be carried out using a plurality of the processing units of the WPP method with respect to the stream which cannot be encoded using the WPP method which is currently available, by which the decoder compatibility can be enhanced.

BRIEF DESCRIPTION OF DRAWINGS

FIG. 6 and FIG. 7 are views illustrating an example of the configuration of a SPS (Sequence Parameter Set);

FIG. 8 and FIG. 9 are views illustrating an example of the configuration of a PPS (Picture Parameter Set);

FIG. 10 to FIG. 12 are views illustrating an example of the configuration of a SH (Slice Header);

BEST MODES FOR CARRYING OUT THE INVENTION

The embodiments of the present invention will be described in detail with reference to the accompanying drawings to the extent that a person having ordinary skill in the art can easily understand. It is obvious that the present invention can be implemented in various forms, and is not limited to the disclosures herein. The descriptions on the components which are not directly related with the descriptions of the present invention will be omitted for the sake of clear understanding of the present invention. Similar components are given similar reference numbers throughout the specification.

Throughout the specification, the phrase that a component is "connected to" another component means that the component is "directly connected" to the component or the component is "electrically connected" to the component through another component.

Throughout the specification, the phrase that a component is mounted "on" another component means that the component is contacting with the component, or another component may be interposed between the above-mentioned two components.

Throughout the specification, the phrase that a component "comprises" another component means that unless otherwise stated, the component may further comprise another component, not excluding other components. The terms "about", substantially", etc. used throughout the specification means that when a natural manufacturing and a substance allowable error are suggested, such an allowable error corresponds the value or is similar to the value, and such values are intended for the sake of clear understanding of the present invention or to prevent an unconscious infringer from illegally using the disclosure of the present invention. The terms "a step wherein~" or a "step of ~" does not mean "a step for the sake of ~".

Throughout the specification, the term "a combination thereof" recited in the expression of the Markush type claim means that at least one or more mixing or combination may be selected from a group consisting of multiple components recited in the expression of the Markush type, more specifically, it means that one or more components selected from a group consisting of components can be included.

As an example of the method for coding an actual video and a depth information map thereof, the coding process may be carried out using the HEVC (High Efficiency Video Coding) which is being jointly standardized based on the MPEG (Moving Picture Experts Group) and the VCEG (Video Coding Experts Group) which are having the highest coding efficiency among the video coding standards that have developed so far, but it is not limited thereto.

The coder unit, in general, is able to carry out an encoding process, and a decoding process. The decoder unit is able to carry out a decoding process. The decoding process by the decoder unit is the same as the decoding process by the coder unit. The description will be provided focusing on the coder unit.

Figure 1:
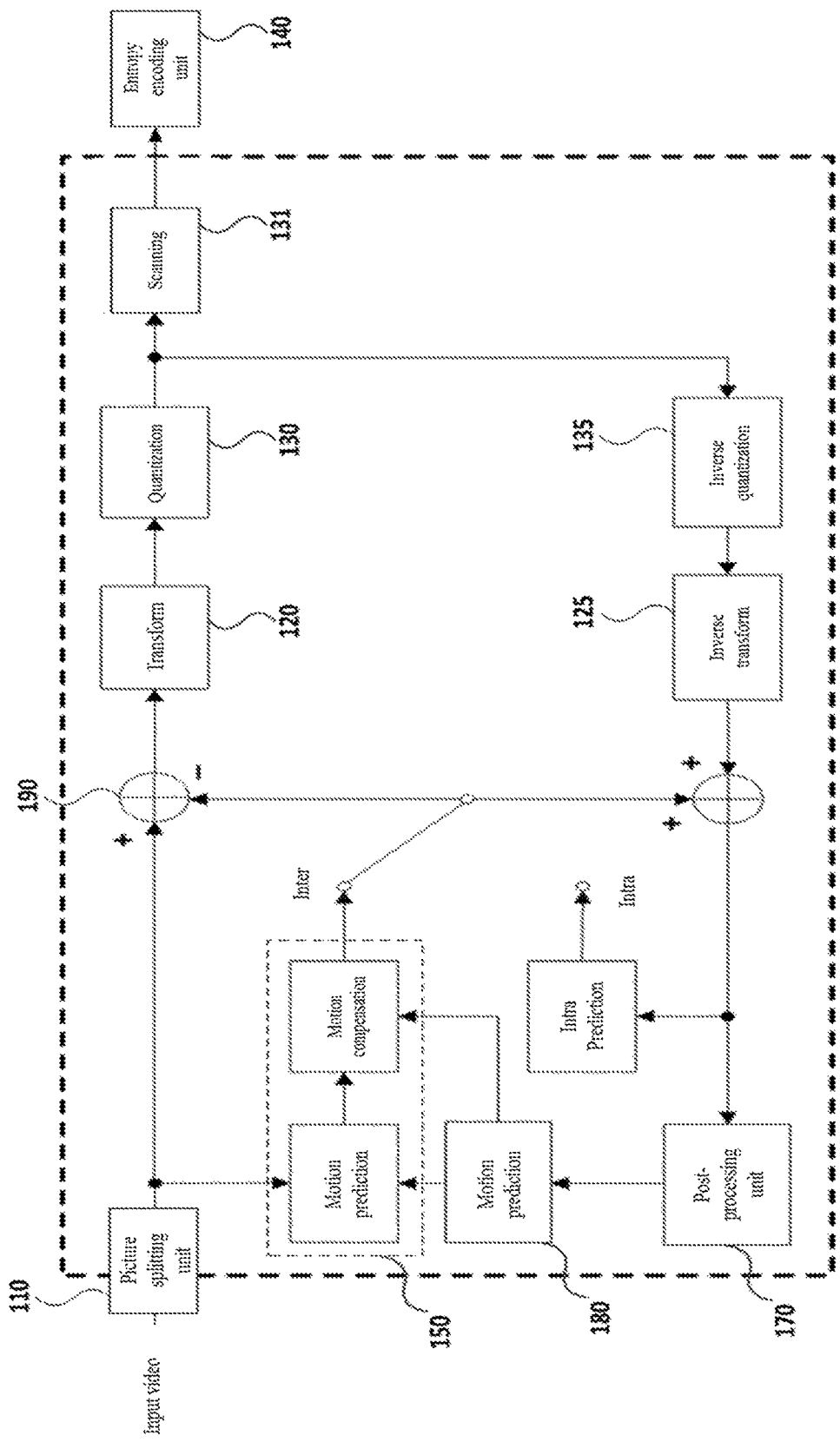
FIG. 1 is a block diagram illustrating the configuration of a video coding device.

FIG. 1 is a block diagram illustrating the configuration of a video coding device.

Referring to FIG. 1, the video coding device 100 may include, but is not limited to, a picture splitting unit 110, a transformation unit 120, a quantization unit 130, a scanning unit 131, an entropy coding unit 140, an intra prediction unit 150, an inter prediction unit 160, a inverse quantization unit 135, a inverse transformation unit 125, a post-processing unit 170, a picture storing unit 180, a subtraction unit 190 and an addition unit 195.

The picture splitting unit 110 is able to analyze the inputted video signals, split the picture into a predetermined size coding unit for each CTU (Coding Tree Unit), determine a prediction mode and determine the size of the prediction unit for each coding unit.

Moreover, the picture splitting unit 110 may transmit a prediction unit which will be coded, to the intra prediction unit 150 or to the inter prediction unit 160 based on the prediction mode (or the prediction method). Moreover, the picture splitting unit 110 may transmit a prediction unit which will be coded, to the subtraction unit 190.

The picture may be formed of a plurality of slices, and the slice may be formed of a plurality of CTUs (Coding Tree Unit).

The CTU may be split into a plurality of CUs (Coding Unit), and a coder may add an information (a flag) showing a split state to the bitstream. A decoder is able to recognize the position of the CTU using an address (CtuAddr).

The CU (Coding Unit) the splitting of which is not allowed, is recognized as a PU (Prediction Unit), and the decoder is able to recognize the position of the PU using a PU index.

The PU (Prediction Unit) may be split into a plurality of partitions. Moreover, the PU may be formed of a plurality of TUs (Transform Unit).

In this case, the picture splitting unit 110 may transmit a video data to the subtraction unit 190 per unit of the block (for example, per unit of the PU or per unit of the TU) of a predetermined size based on the determined coding mode.

Figure 2:
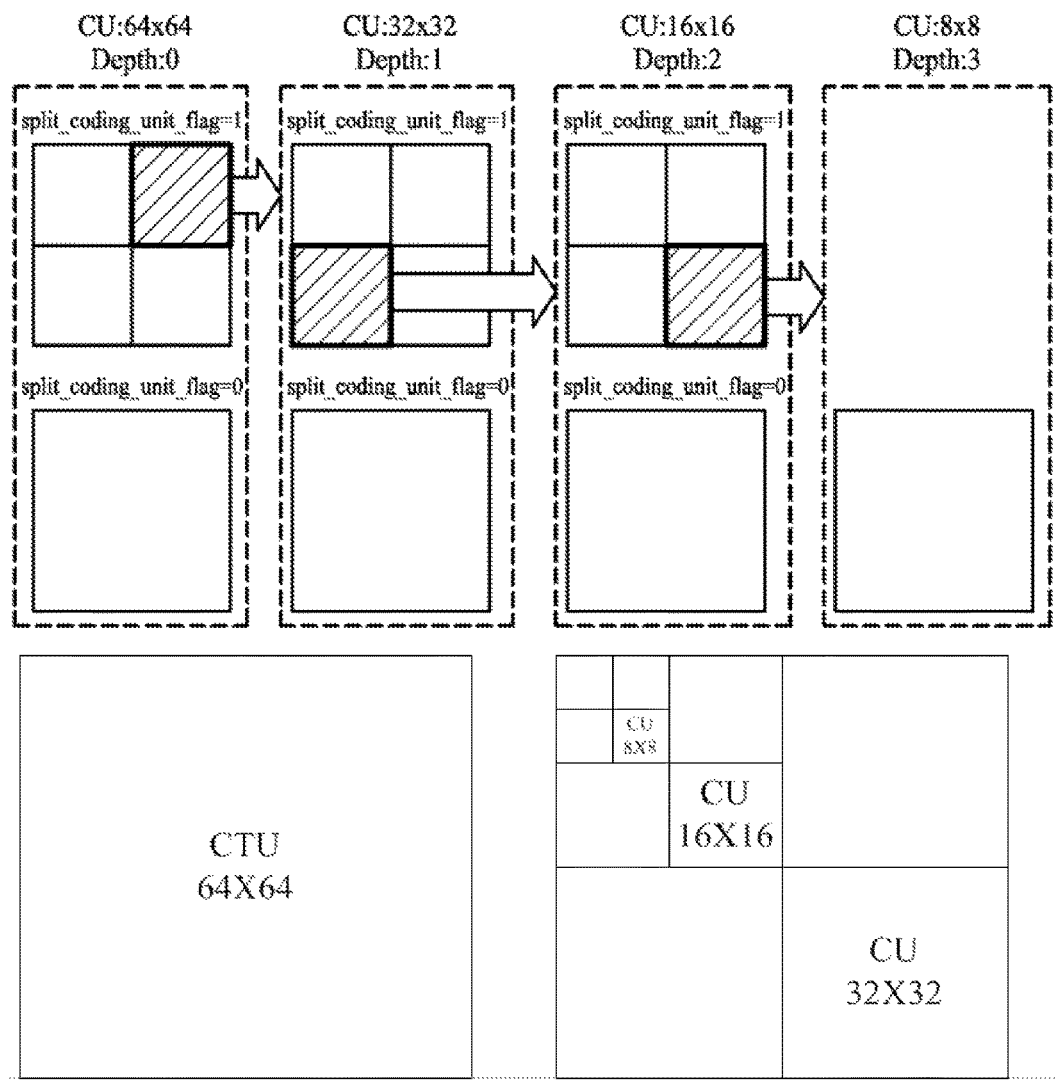
FIG. 2 is a view for describing an example of a method for splitting a video into block units and processing the same.

Referring to FIG. 2, a CTU (Coding Tree Unit) is used as the video coding unit, and the CTU can be defined in various square patterns. The CTU may include a coding unit CU (Coding Unit).

The coding unit (CU) has a shape of a quad tree, and the coding will be carried out until the depth becomes 3 based on the depth of 0 in case of the Largest Coding Unit the size of which is 64×64, namely, searching for the optimum prediction unit in a recursive way up to the CU of a size of 8×8.

The prediction unit provided to carry out prediction can be designed as a PU (Prediction Unit), and for each CU, the prediction of the unit split into a plurality of blocks is carried out, and the prediction will be carried out in a state where it is split into a square shape and a quadrangular shape.

The transformation unit 120 is provided to transform the original blocks of the inputted prediction unit and the residual block which corresponds to the residual signal of the prediction block generated by the intra prediction unit 150 or the inter prediction unit 160. The residual block may be formed of a coding unit or a prediction unit. The residual block formed of the coding unit or the prediction unit can be split into the optimum transformation unit and can be transformed. Different matrix can be determined based on the prediction mode (intra or inter). Moreover, since the residual signal of the intra prediction has an orientation based on the intra prediction mode, the transformation matric may be adaptively determined based on the intra prediction mode.

The transformation unit may be transformed by two (horizontal and vertical) one-dimensional transformation matrices. For example, one transformation matrix which has been previously determined may be determined in case of the inter prediction.

Contrary, in case of the intra prediction, since the residual block may have a high possibility to have a vertical direction orientation in case where the intra prediction mode is horizontal, a DCT-based integer matrix will be employed in the vertical direction, and the DST-based or KLT-based integer matrix will be employed in the horizontal direction. If the intra prediction mode is vertical, the DST-based or KLT-based integer matrix will be employed, and the DCT-based integer matrix will be employed in the horizontal direction.

In case of the DC mode, the DCT-based integer matrix will be employed in both the directions. Moreover, in case of the intra prediction, the transformation matrix may be adaptively determined based on the size of the transformation unit.

The quantization unit 130 may determine a quantization step size so as to quantize the coefficients of the residual blocks transformed by the transformation matrix. The quantization step size may be determined for each coding unit (hereinafter, referred to a quantization unit) of over a predetermined determined size.

The previously set size may be 8×8 or 16×16. Moreover, the coefficients of the transformation blocks are quantized using the determined quantization step size and the quantization matrix determined based on the prediction mode.

The quantization unit 130 will use the quantization step size of the quantization unit near the current quantization unit as a quantization step size predictor of the current quantization unit.

The quantization unit 130 may generate a quantization step size predictor of the current quantization unit in such way to use one or to effective quantization step sizes by searching in the sequence of the left quantization unit of the current quantization unit, the upper quantization unit and the left upper quantization unit.

For example, the effective first quantization step size searched in the sequence may be determined as a quantization step size predictor. Moreover, the average value of the two effective quantization step sizes searched in the sequence may be determined as a quantization step size predictor. If only one is effective, it may be determined as the quantization step size predictor.

If the quantization step size predictor is determined, a difference value between the quantization step size of the current coding unit and the quantization step size predictor will be transmitted to the entropy coding unit 140.

Meanwhile, there may be a possibility that all of the left coding unit of the current coding unit, the upper coding unit and the left upper coding unit may not exist. Meanwhile, the coding unit which has already been may exist in the largest coding unit before the coding sequence.

In this way, the quantization step size of the just previous quantization unit in terms of the coding sequence in the quantization unit near the current coding unit and the largest coding unit may become a candidate.

In this case, the priority may be given in the sequence of (1) the left quantization unit of the current coding unit, (2) the upper quantization unit of the current coding unit, (3) the left upper quantization unit of the current coding unit, and (4) the just previous quantization unit in terms of the coding sequence. The left upper quantization unit may be omitted.

The quantized transformation block will be provided to the inverse quantization unit 135 and the scanning unit 131.

The scanning unit 131 is provided to scan the coefficient of the quantized transformation blocks and transform them into one-dimensional quantization coefficients. Since the coefficient distributions of the transformation blocks after the quantization may be dependent on the intra prediction mode, the scanning method may be determined based on the intra prediction mode.

Moreover, the coefficient scanning method may be determined different based on the size of the transformation unit, and the scan pattern may change based on the orientation intra prediction mode, and the scan sequences of the quantization coefficient are scanned in the inverse direction.

If the quantized coefficients are split into a plurality of sub-sets, the same scan pattern is applied to the quantization coefficient in each sub-set. The scan pattern between the sub-sets is applied with a zigzag scan or a diagonal scan. It is preferred that the scan pattern is scanned with the residual sub-sets in the normal direction from the main sub-set which is include DC, and the inverse direction thereof is available as well.

The scan pattern may be set between the sub-sets in the same way as the scan pattern of the quantized coefficients in the sub-set. In this case, the scan pattern between the sub-sets is determined based on the intra prediction mode. The coder may transmit to the decoder an information showing the position of the last quantization coefficient the value of which is not 0 in the transformation unit.

The information showing the position of the last quantization coefficient the value of which is not 0 in each sub-set may be transmitted to the decoder.

The inverse quantization unit 135 is able to inversely quantize the quantized quantization coefficient. The inverse transformation unit 125 may recover the inversely quantized transformation coefficient into the residual block of the space region. The adder will add the residual blocks recovered by the inverse transformation unit and the prediction blocks received from the intra prediction unit 150 or the inter prediction unit 160, thus generating a recovery block.

The post-processing unit 170 is provided to carry out a deblocking filtering procedure to remove a blocking effect which occurs at the recovered picture, an adaptive offset application procedure to supplement a difference value with respect to the original video per unit of the pixel, and an adaptive loop filtering procedure to supplement a difference value with respect to the original video per unit of the coding.

It is preferred that the deblocking filtering procedure is applied to a boundary between the prediction unit having a size larger than a previously set size and the transformation unit. The size may be 8×8. The deblocking filtering procedure may be formed of a step for determining a boundary to be filtered, a step for determining a boundary filtering strength which will be applied to the boundary, a step for determining an application state of a deblocking filter, and a step for selecting a filter which will be applied to the boundary.

The application state of the deblocking filter may be determined based on (i) whether or not the boundary filtering strength is larger than 0, and (ii) whether or not the value showing a changing state of the pixel values at the boundary between two neighboring blocks (a block P and a block Q) at the boundary to be filtered is smaller than a first criteria value which is determined by a quantization parameter.

It is preferred that the number of the filters are two. If the absolute value of a difference value between two pixels at the block boundary is larger than or equal to a second criteria value, a filter which is able to carry out a relatively weak filtering is selected.

The second criteria value is determined based on the quantization parameter and the boundary filtering strength.

The adaptive offset application procedure is provided to decrease a difference value (a distortion) between the pixel and the original pixel in the video to which the deblocking filter is applied. Whether or not the adaptive offset application procedure is carried out can be determined per unit of the picture or the slice.

The picture or slice may be split into a plurality of offset regions, and the offset type may be determined for each offset region. The offset type may include an edge offset type of a previously set number (for example, 4 in number) and two band offset types.

If the offset type is an edge offset type, the edge type to which each pixel belongs can be determined, and an offset which corresponds thereto will be applied. The edge type will be determined based on the distribution of two pixel values which are neighboring with the current pixel.

The adaptive loop filtering procedure is able to carry out a filtering based on a value obtained by comparing to the original video the recovered video which has been subjected to the deblocking filtering procedure or the adaptive offset application procedure. The adaptive loop filtering may be applied to the whole pixels which are contained in the block wherein the determined ALF is a size of 4×4 or 8×8.

The actual application of the adaptive loop filter may be determined for each coding unit. The size and coefficient of the loop filter which will be applied based on each coding unit may change. The information showing the actual application of the adaptive loop filter for each coding unit may be included in each slice header.

In case of a color difference signal, the actual application of the adaptive loop filter can be determined per unit of the picture. Different from luminance, the type of the loop filter may have a rectangular shape.

The adaptive loop filter may determine an actual application per unit of the slice. The information, therefore, is included in a header or a picture header, wherein the information shows whether or not the adaptive loop filtering will be applied to the current slice.

If it shows that the adaptive loop filtering has been applied to the current slice, the slice header or picture header may include an information which shows the filter length of the horizontal and/or vertical directions of the luminance component which is additionally used during the adaptive loop filtering procedure.

The slice header or the picture header may include an information showing the number of filter sets. If the number of the filter sets is over 2, the filtering coefficients may be coded using the prediction method. For this reason, the slice header or picture header may include an information showing whether or not the filter coefficients will be coded based on the prediction method. If the prediction method is employed, the predicted filter coefficient can be included.

Meanwhile, in addition to the luminance, the color difference component can be adaptively filtered. The information showing whether or not each color difference component will be filtered may be included in the slice header or the picture header. In this case, in order to reduce the number of bits, the information showing whether or not the filtering will be carried out with respect to Cr and Cb can be jointly coded (namely, a multiplexing coding).

At this time, In case of the color components, since an occasion where both Cr and Cb are not filtered, may most frequently occur for the sake of complexity reduction, the smallest index will be allocated if both Cr and Cb are not filtered, and then the entropy coding will be carried out.

Moreover, if both Cr and Cb are filtered, the highest index will be allocated, and then the entropy coding will be carried out.

The picture storing unit 180 will receive the post-processing video data from the post-processing unit 170 and will recover and store the videos per unit of the picture. The picture may be a video per unit of the frame or a video per unit of the field. The picture storing unit 180 may equip with a buffer (not illustrated) which is able to store a plurality of pictures.

The inter prediction unit 160 may carry out a motion prediction using at least one reference picture stored in the picture storing unit 180 and may determine a reference picture index showing a reference picture, and a motion vector.

Moreover, a prediction block corresponding to a prediction unit which will be coded can be extracted and outputted from a reference picture which has been used for a motion prediction among a plurality of reference pictures stored in the picture storing unit 180 in accordance with the determined reference picture index and motion vector.

The intra prediction unit 150 may carry out an intra prediction coding in such a way to use a pixel value which has been reconstructed inside the picture which contains the current prediction unit.

The intra prediction unit 150 may carry out an intra prediction by selecting any one among the intra prediction modes the number of which has been previously set based on the size of the current block after the current prediction unit which will be predicted and coded is received.

The intra prediction unit 150 is able to adaptively filter a reference pixel so as to generate an intra prediction block. If the reference pixel is not available, the reference pixel can be generated using the available reference pixels.

The entropy coding unit 140 may carry out an entropy coding with respect to the quantization coefficient quantized by the quantization unit 130, the intra prediction information received from the intra prediction unit 150 and the motion information received from the inter prediction unit 160.

Figure 3:
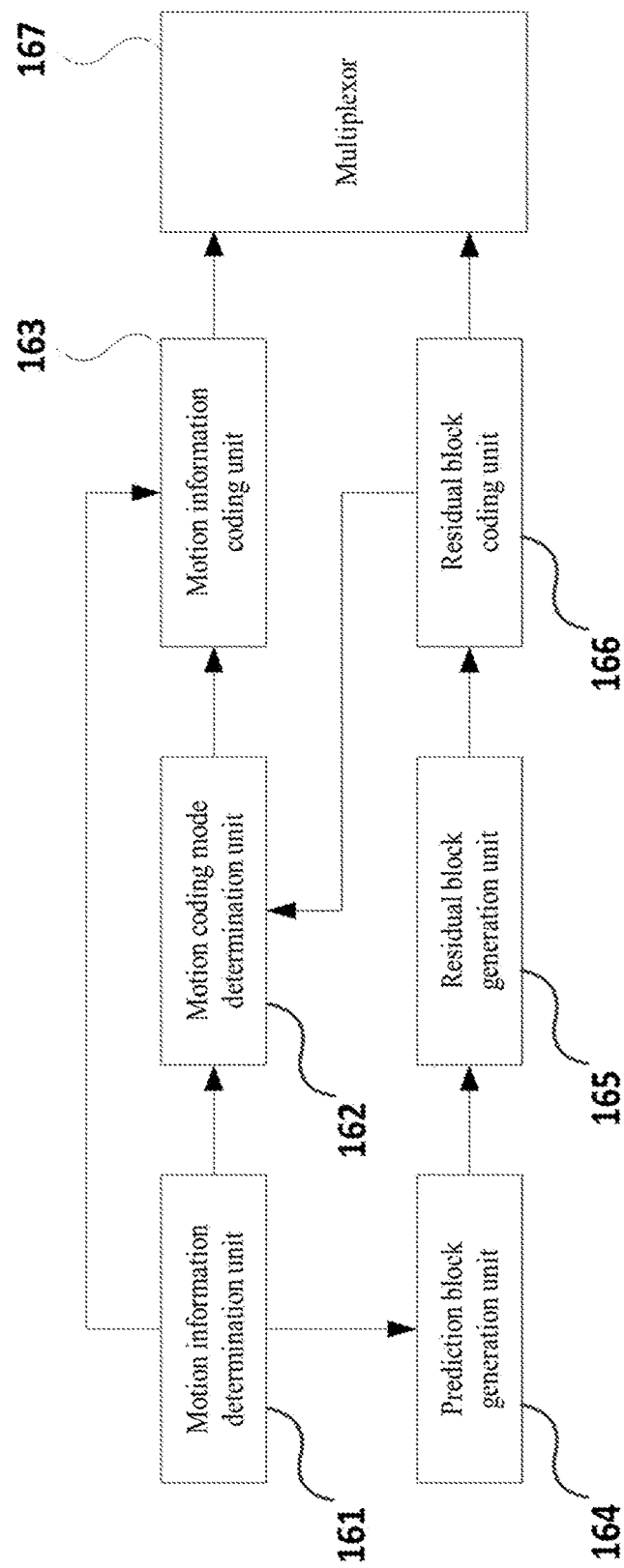
FIG. 3 is a block diagram for describing an embodiment of the configuration which is provided to carry out an inter-prediction using a coder unit.

FIG. 3 is a block diagram illustrating an embodiment of a configuration which is provided to carry out an inter prediction in a coding device. The inter prediction coding device illustrated therein may include, but is not limited to, a motion information determination unit 161, a motion information coding mode determination unit 162, a motion information coding unit 163, a prediction block generation unit 164, a residual block generation unit 165, a residual block coding unit 166 and a multiplexor 167.

Referring to FIG. 3, the motion information determination unit 161 may determine a motion information of the current block. The motion information may be formed of a reference picture index and a motion vector. The reference picture index may show any of the pictures which have been coded and recovered.

If the current block is subjected to a single direction inter prediction coding, it may represent any of the reference pictures which belong to a list 0 (L0). Meanwhile, the current block is subjected to a bidirectional prediction coding, it may include a reference picture index showing any of the reference pictures of the list 0 (L0) and a reference picture index showing any of the reference pictures of the list 1 (L1).

Moreover, if the current block is subjected to the bidirectional prediction coding, an index may be included, which shows one or two pictures among the reference pictures of a combined list (LC) generated by combining the lists 0 and 1.

The motion vector may show the position of the prediction block in the picture that each reference picture index indicates. The motion vector may be a pixel unit (an integer unit) or a sub-pixel unit.

For example, it may have a resolution of ½, ¼, ⅛ or ⅟₁₆ pixels. If the motion vector is not an integer unit, the prediction block is generated from the pixels of the integer unit.

The motion information coding mode determination unit 162 may determine that the motion information of the current block can be coded in which mode among the skip mode, the merge mode and the AMVP mode.

The skip mode can be employed if there is a skip candidate having the same motion information as the motion information of the current block, and the residual signal is 0. Moreover, the skip mode may be employed if the current block has the same size as the coding unit. The current block may be considered the prediction unit.

The merge mode may be employed if there is a merge candidate having the same motion information as the motion information of the current block. The merge mode may be employed if there is a residual signal in case where the current block has a size different from the coding unit, and the size is same. The merge candidate and the skip candidate may be same.

The AMVP mode may be employed if the skip mode and the merge mode cannot be employed. The AMVP candidate having the motion vector which is most similar to the motion vector of the current block is selected as an AMVP predictor.

The motion information coding unit 163 may code a motion information based on a method determined by the motion information coding mode determination unit 162. If the motion information coding mode is the skip mode or the merge mode, the merge motion vector coding procedure will be carried out. If the motion information coding mode is the AMVP, the AMVP coding procedure will be carried out.

The prediction block generation unit 164 may generate a prediction block using the motion information of the current block. If the motion vector is an integer unit, a prediction block of the current block can be generated in such a way to copy the block which corresponds to the position that the motion vector in the picture indicates, which the reference picture index shows.

However, if the motion vector is not an integer unit, the pixels of the prediction block can be generated from the integer unit pixels in the picture that the reference picture index shows.

In case of the luminance pixel, the prediction pixel can be generated using an 8-tap interpolation filter. In case of the color difference pixel, the prediction pixel can be generated using a 4-tap interpolation filter.

The residual block generation unit 165 may generate a residual block in such a way to use the current block and a prediction block of the current block. If the size of the current block is 2N×2N, the residual block can be generated using the current block and the prediction block of a size of 2N×2N corresponding to the current block.

However, if the size of the current block used for the prediction is 2N×N or N×2N, a prediction block with respect to each of two 2N×N blocks forming the 2N×N is obtained, and then the final prediction block of a size of 2N×2N can be generated using the two 2N×N prediction blocks.

Moreover, the residual block of the 2N×2N can be generated using the prediction block of a size of 2N×2N. The pixels at a boundary portion can be overlapped and smoothed so as to remove any discontinuity at a boundary portion between the two prediction blocks of a size of 2N×N.

The residual block coding unit 166 may split the generated residual block into one or more transformation units. Moreover, each transformation unit is subjected to a transformation coding, a quantization and an entropy coding. Here, the size of the transformation unit may be determined by the quad tree method based on the size of the residual block.

The residual block coding unit 166 may transform the residual block generated by the inter prediction method in such a way to use an integer-based transformation matrix. The transformation matrix is an integer-based DCT matrix.

The residual block coding unit 166 may use a quantization matrix so as to quantize the coefficients of the residual block transformed by the transformation matrix. The quantization matrix may be determined by a quantization parameter.

The quantization parameter may be determined for each coding unit which has a size which is over a previously set size. The previously set size may be 8×8 or 16×16. If the current coding unit is smaller than a previously determined size, only the quantization parameter of the first coding unit in terms of the coding sequences of a plurality of the coding units which all have the previously set sizes, is coded, and since the quantization parameters of the remaining coding units are same as the parameter, the coding is not carried out.

Moreover, the coefficients of the transformation block are quantized using the quantization matrix which is determined based on the determined quantization parameter and the prediction mode.

The quantization parameter determined for each coding unit having a size which is over a previously set size can be predicted and coded using the quantization parameter of the coding unit which is neighboring with the current coding unit. A quantization parameter predictor of the current coding unit can be generated using one or two effective quantization parameters by carrying out a search in the sequence of the left coding unit of the current coding unit, and the upper coding unit.

For example, the first effective quantization parameter searched in the sequence may be determined as a quantization parameter predictor. Moreover, the first effective quantization parameter may be determined as a quantization parameter predictor by carrying out a search in the sequence of the left coding unit, and the just previous coding unit in terms of the coding sequence.

The coefficients of the quantized transformation block may be transformed into one-dimensional quantization coefficients. The scanning method may be set different based on the TU size and the intra prediction method.

For example, the coefficients may be scanned in the diagonal direction, and in case of the intra block wherein the size of the TU is 4×4, it may change based on the intra prediction direction. If the intra prediction direction of the intra block wherein the size of the TU is 4×4 is almost vertical, the scanning may be carried out in the horizontal direction, and if it is almost horizontal, the scanning may be carried out in the vertical direction.

Moreover, the coefficients may be set different based on the entropy coding mode. For example, in case of the coding by the CABAC, the quantization coefficients which have been inter-predicted and coded may be scanned by a previously determined method (a zigzag method or a raster scan in the diagonal direction). In case of the coding by the CAVLC, the scanning may be carried out by a method which is different from the aforementioned method.

For example, if the scanning method is inter, it can be determined by a zigzag prediction mode, and if it is infra, it can be determined by an intra prediction mode. Moreover, the coefficient scanning method may be determined different based on the size of the transformation unit.

The scanning pattern may change based on the orientation intra prediction mode. The scanning sequence of the quantization coefficients can be scanned in the inverse direction.

The multiplexer 167 is provided to multiplex the motion information coded by the motion information coding unit 163 and the residual signals coded by the residual block coding unit. The motion information may change based on the coding mode.

More specifically, in case of the skip or merge mode, only an index which shows a predictor is included. In case of the AMVP, the reference picture index of the current block, the difference value motion vector and the AMVP index are included.

The operation of the intra prediction unit 150 will be described according to an embodiment of the present invention.

First, the prediction mode information and the size of the prediction block are received by the picture splitting unit 110, and the prediction mode information represents an intra mode. The size of the prediction block may be 64×64, 32×32, 16×16, 8×8, 4×4, etc. which means a square, but it is not limited thereto. The size of the prediction block may be a non-square, not a square.

Next, the reference pixel will be read from the picture storing unit 180 so as to determine the intra prediction mode of the prediction block.

The reference pixel generation can be judged in such a way to review whether or not there is any reference pixel which is not available. The reference pixels may be used to determine the intra prediction mode of the current block.

If the current block positions at an upper boundary of the current picture, the pixels which position near the upper side of the current block are not defined. Moreover, if the current block positions at the left boundary of the current picture, the pixels which position at the left side of the current block are not defined.

It is judged that these pixels are not available pixels. Moreover, if the pixels which position at the upper or left side of the slice are not pixels which are first coded and recovered in a state where the current block positions at a slice boundary, such pixels are not available pixels.

As mentioned above, if there are not pixels which are neighboring with the left or upper side of the current pixel or there are not pixels which have been previously coded or recovered, the intra prediction mode of the current block can be determined using only the available pixels.

However, the reference pixels at the unavailable positions may be generated using the available reference pixels of the current block. For example, if the pixels at the upper block are unavailable, the upper side pixels may be generated using a unit or all of the left side pixels, and vice versa.

More specifically, the reference pixels may be generated in such a way to copy the available reference pixels which are at the nearest positions in the previously determined direction from the reference pixels which are at the unavailable positions. If there are not the available reference pixels in the previously determined direction, the reference pixels may be generated in such a way to copy the available reference pixels at the nearest positions in the opposite direction.

Meanwhile, if there are only the upper or left side pixels of the current block, the pixels may be determined as the unavailable reference pixels based on the coding mode of the block to which the aforementioned pixels belong.

For example, if the block to which the reference pixels neighboring with the upper side of the current block belong is the block which has been inter-coded and recovered, the aforementioned pixels may be determined as the unavailable pixels.

In this case, the available reference pixels can be generated using the pixels which belongs to the block wherein the block near the current block has been intra-coded and recovered. In this case, it needs to transmit to a decoder an information with which the coder judges the available reference pixels based on the coding mode.

Next, the intra prediction mode of the current block is determined using the reference pixels. The number of the intra prediction modes allowable to the current block may change based on the size of the block. For example, if the size of the current block is 8×8, 16×16, and 32×32, there may exist 34 intra prediction modes, and if the size of the current block is 4×4, there may exist 17 intra prediction modes.

The 34 or 17 intra prediction modes may be formed of at least one or more non-directional modes and a plurality of directional modes.

One and more non-directional modes may be a DC mode and/or a planar mode. If the DC mode and the planar mode are included as a non-directional mode, there may exist 35 intra prediction modes irrespective of the size of the current block.

In this case, there may be two non-directional modes (a DC mode and a planar mode), and 33 directional modes.

In the planar mode, the prediction block of the current block may be generated using at least one pixel value (or a prediction value of the pixel value, hereinafter it is referred to a first reference value) positioning at the bottom-right portion of the current block and the reference pixels.

As described above, the configuration of the device for decoding videos according to an embodiment of the present invention may be derived from the configuration of the device for coding videos described with reference to FIG. 1 to FIG. 3. For example, as described with reference to FIG. 1, the videos can be decoded in such a way to carry out the inverse procedure of the coding procedure.

Figure 4:
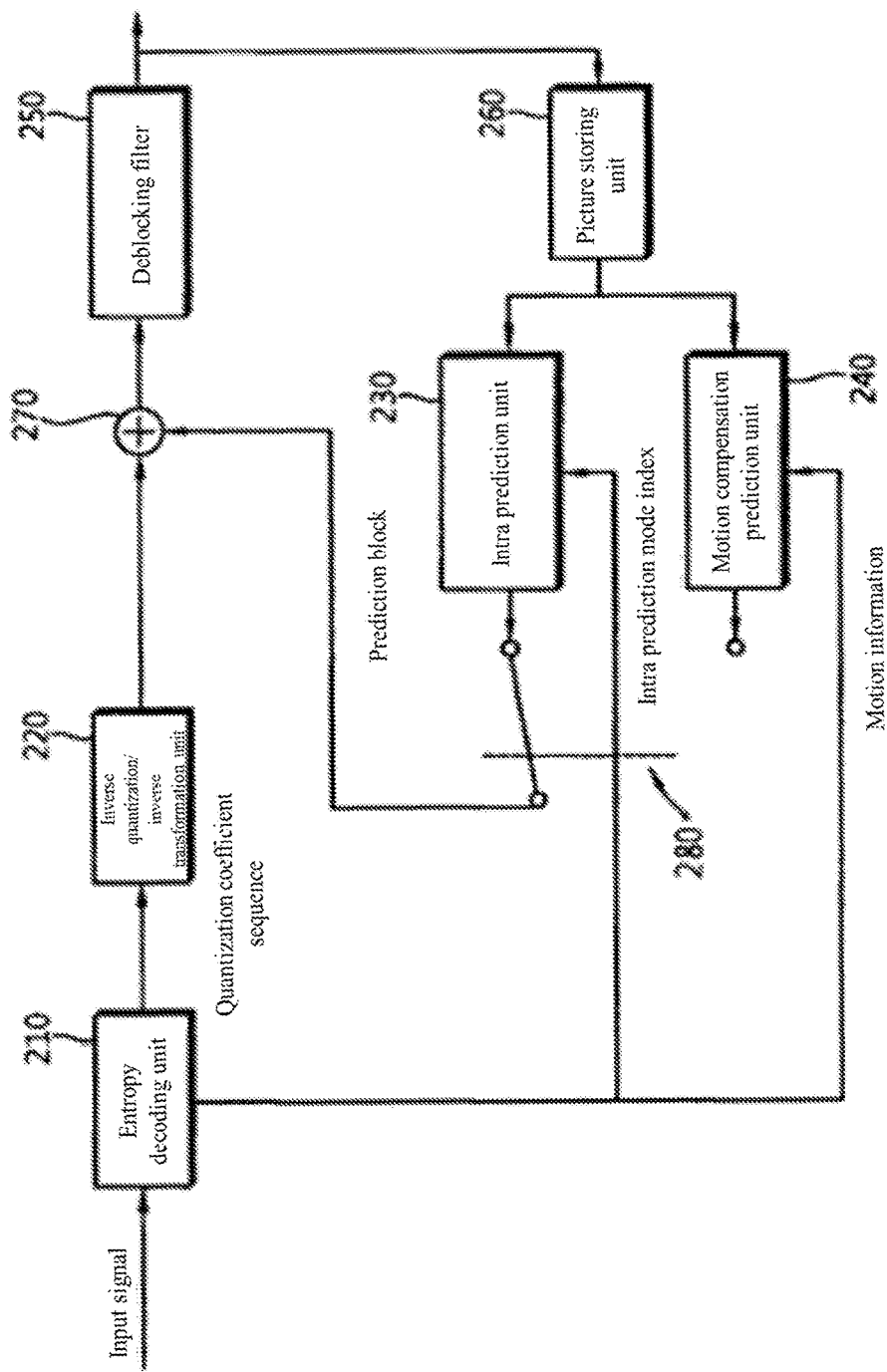
FIG. 4 is a block diagram illustrating the configuration of a video decoder unit according to an embodiment of the present invention.

FIG. 4 is a block diagram illustrating the configuration of a device for decoding videos according to an embodiment of the present invention.

Referring to FIG. 4, the device for decoding videos according to the present invention may include, but is not limited to, an entropy decoding unit 210, a inverse quantization/inverse transformation unit 220, an adder 270, a deblocking filter 250, a picture storing unit 260, an intra prediction unit 230, a motion compensation prediction unit 240, and an intra/inter switching switch 280.

The entropy decoding unit 210 is provided to decode a coding bitstream transmitted from the video coding device and split it into an intra prediction mode index, a motion information, a quantization coefficient sequence, etc. The entropy decoding unit 210 is able to supply the decoded motion information to the motion compensation prediction unit 240.

The entropy decoding unit 210 may supply the intra prediction mode index to the intra prediction unit 230 and the inverse quantization/inverse transformation unit 220. Moreover, the entropy decoding unit 210 may supply the inverse quantization coefficient sequence to the inverse quantization/inverse transformation unit 220.

The inverse quantization/inverse transformation unit 220 is able to transform the quantization coefficient sequence into a inverse quantization coefficient of a two-dimensional matrix. Any of a plurality of the scanning patterns is selected for the aforementioned transformation. Any of a plurality of the scanning patterns may be selected based on either the prediction mode (namely, any of the intra prediction and the inter prediction) of the current block or the intra prediction mode.

The intra prediction mode is received from the intra prediction unit or the entropy decoding unit.

The inverse quantization/inverse transformation unit 220 may allow to recover the quantization coefficient using the quantization matrix selected among a plurality of the quantization matrixes with respect to the two-dimensional quantization coefficient. Different quantization matrixes may be employed based on the size of the current block which will be recovered. The quantization matrix may be selected based on either the prediction mode of the current block or the intra prediction mode with respect to the same size blocks.

Moreover, the residual block may be recovered in such a way to inversely transform the recovered quantization coefficient.

The adder 270 is provided to recover the video block in such a way to add the residual block recovered by the inverse quantization/inverse transformation unit 220 and the prediction block generated by the intra prediction unit 230 or the motion compensation prediction unit 240.

The deblocking filter 250 is provided to carry out a deblocking filter process with respect to the recovery video generated by the adder 270. In this way, it is possible to reduce any deblocking artifact which may occur due to the loss in the video during the quantization procedure.

The picture storing unit 260 is a frame memory which is able to maintain a local decoding video with respect to which a deblocking filter process has been carried out using the deblocking filter 250.

The intra prediction unit 230 is able to recover the intra prediction mode of the current block based on the intra prediction mode index received from the entropy decoding unit 210 and generate a prediction block based on the recovered intra prediction mode.

The motion compensation prediction unit 240 is provided to generate a prediction block with respect to the current block from the pictures stored in the picture storing unit 260 based on the motion vector information. If a motion compensation of a decimal point accuracy is employed, the prediction block may be generated using the selected interpolation filter.

The intra/inter switching switch 280 is provided to supply to the adder 270 the prediction block generated by either the intra prediction unit 230 or the motion compensation prediction unit 240 based on the coding mode.

Figure 5:
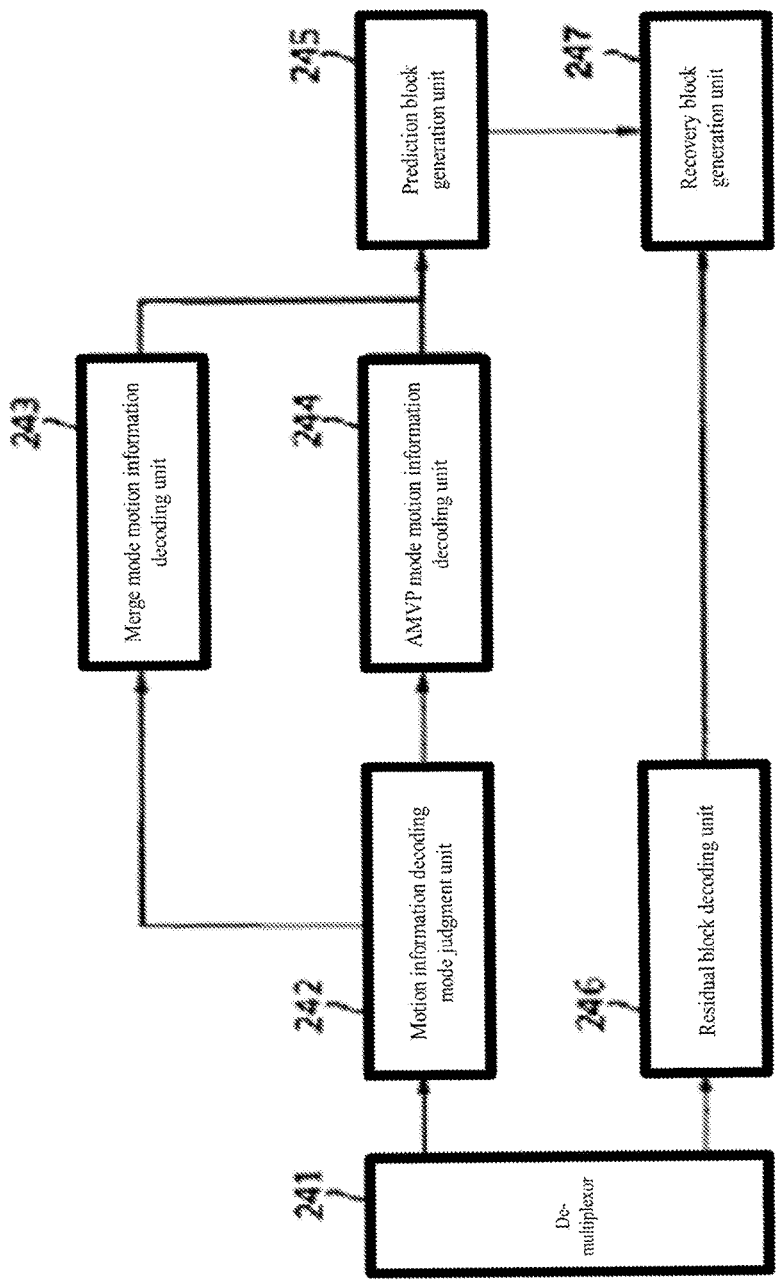
FIG. 5 is a block diagram for describing an embodiment of the configuration which is provided to carry out an inter-prediction using a decoder unit.

FIG. 5 is a block diagram illustrating a configuration wherein a decoding device carries out an inter prediction according to an embodiment of the present invention. The inter prediction decoding device may include, but is not limited to, a demultiplexor 241, a motion information coding mode judgement unit 242, a merge mode motion information decoding unit 243, an AMVP mode motion information decoding unit 244, a prediction block generation unit 245, a residual block decoding unit 246, and a recovery block generation unit 247.

Referring to FIG. 5, the demultiplexor 241 is provided to demultiplex the motion information currently coded from the received bitstream and the coded residual signals. The demultiplexor 241 is able to transmit the demultiplexed motion information to the motion information coding mode judgment unit 242 and transmit the demultiplexed residual signal to the residual block decoding unit 246.

The motion information coding mode judgment unit 242 is provided to judge the motion information coding mode of the current block. The motion information coding mode judgment unit 242 may judge that if the skip_flag of the received bitstream has a value of 1, the motion information coding mode of the current block has been coded into a skip coding mode.

The motion information coding mode judgment unit 242 may judge that the motion information coding mode of the current block has been coded into a merge mode. In the motion information coding mode, the skip_flag of the received bitstream has a value of 0, and the motion information received from the demultiplexor 241 has only a merge index.

The motion information coding mode judgment unit 242 may judge that if the skip_flag of the received bitstream has a value of 0, and the motion information received from the demultiplexor 241 has a picture index and a difference value motion vector, the motion information coding mode of the current block has coded into an AMVP mode.

The merge mode motion information decoding unit 243 may be activated if the motion information coding mode judgment unit 242 judges that the motion information coding mode of the current block is the skip or merge mode.

The AMVP mode motion information decoding unit 244 may be activated if the motion information coding mode judgment unit 242 judges that the motion information coding mode of the current block is the AMVP mode.

The prediction block generation unit 245 is provided to generate a prediction block of the current block using the motion information recovered by the merge mode motion information decoding unit 243 or the AMVP mode motion information decoding unit 244.

If the motion vector is an integer unit, the prediction block can be generated in such a way to copy the block corresponding to the position where the motion vector in the picture indicated by the reference picture index is indicating.

However, if the motion vector is not an integer unit, the pixels of the prediction block can be generated from the integer unit pixels in the picture that the reference picture index is indicating. In case of the luminance pixels, the prediction pixels can be generated using the 8-tap interpolation filter. In case of the color difference pixels, the prediction pixels can be generated using the 4-tap interpolation filter.

The residual block decoding unit 246 is provided to entropy-decode the residual signals. Moreover, the two-dimensional quantized coefficient block may be generated in such a way to inversely scan the entropy decoded coefficient. The inverse scanning method may be integrated into the CABAC-based inverse scanning method.

Moreover, it changes based on the entropy decoding method. In case where the decoding has been carried out based on the CABAC, and the decoding has been carried out based on the CAVLC, the inverse scanning method of the residual signal may change. For example, if the decoding has been carried out based on the CABAC, the raster inverse scanning method in the diagonal direction may be employed, and if the decoding has been carried out based on the CAVLC, the zigzag inverse scanning method may be employed.

Moreover, the inverse scanning method may be determined different based on the size of the prediction block.

The residual block decoding unit 246 is provided to inversely quantize the generated coefficient block using the inverse quantization matrix. The quantization parameter will be recovered in order to induce the quantization matrix. The quantization step size may be recovered for each coding unit having a size which is over a previously set size.

The size of the previously set size may be 8×8 or 16×16. If the current coding unit is smaller than the previously set size, only the quantization parameters of the first coding unit in terms of the coding sequence among a plurality of the coding units within the previously set sizes are recovered, and since the quantization parameters of the remaining coding units are same as the parameters, the coding is not carried out.

The quantization parameters of the coding unit neighboring with the current coding unit may be used so as to recover the quantization parameters which have been determined for each unit having a size which is over the previously set size. The effective first quantization parameter may be determined as a quantization parameter predictor of the current coding unit in such a way to carry out a search in the sequence of the left coding unit of the current coding unit, and the upper coding unit.

Moreover, the effective first quantization parameter may be determined as a quantization parameter predictor in such a way to carry out a search in the sequence of the left coding unit, and the just previous coding unit in terms of the coding sequence. The quantization parameter of the current prediction unit can be recovered using the aforementioned determined quantization parameter predictor and the difference value quantization parameter.

The residual block decoding unit 260 is provided to recover the residual block in such a way to inversely transform the inversely quantized coefficient block.

The recovery block generation unit 270 is provided to generate a recovery block in addition to the prediction block which has been generated by the prediction block generation unit 250 and the residual block generated by the residual block decoding unit 260.

The procedure for recovering the current block via the intra prediction will be described with reference to FIG. 3.

First, the intra prediction mode of the current block is decoded from the received bitstream. For this, the entropy decoding unit 210 will recover a first intra prediction mode index of the current block with reference to any of a plurality of the prediction mode tables.

A plurality of the intra prediction mode tables are the table shared by the coder and the decoder, and any of the tables may be employed based on the distribution of the intra prediction modes of a plurality of the blocks neighboring with the current block.

For example, if the intra prediction mode of the left block of the current block and the intra prediction mode of the upper block of the current block are same, the first intra prediction mode index of the current block will be recovered by employing the first intra prediction mode table, and if not same, the first intra prediction mode index of the current block will be recovered by employing the second intra prediction mode table.

As another example, if the intra prediction modes of the upper block and the left block of the current block are all the directional intra prediction modes, and if the direction of the intra prediction mode of the upper block and the direction of the intra prediction mode of the left block are all in a predetermined angle range, the first intra prediction mode index of the current block will be recovered by employing the first intra prediction mode table, and if the directions are out of the predetermined angle range, the first intra prediction mode index of the current block will be recovered by employing the second intra prediction mode table.

The entropy decoding unit 210 is provided to transmit the first intra prediction mode index of the recovered current block to the intra prediction unit 230.

The intra prediction unit 230 which has received the first intra prediction mode index will determine the most available mode of the current block as the intra prediction mode of the current block if the aforementioned index has a minimum value (namely, 0).

However, if the index has a value except for 0, the index indicated by the most available mode of the current block will be compared to the first intra prediction mode index. As a result of the comparison, if the first Ingra prediction mode index is not smaller than the index indicated by the most available mode of the current block, the intra prediction mode corresponding to the second intra prediction mode index obtained by adding 1 to the first intra prediction mode index will be determined as the intra prediction mode of the current block, and otherwise the intra prediction mode corresponding to the first intra prediction mode index will be determined as the intra prediction mode of the current block.

The intra prediction mode which may be available for the current block may be formed of at least one or more non-directional modes, and a plurality of the directional modes.

At least one or more non-directional mode may be a DC mode and/or planar mode. Moreover, either the DC mode or the planar mode may be adaptively included in the allowable intra prediction mode set.

For this, an information specifying a non-directional mode included in the allowable intra prediction mode set may be included in the picture header or the slice header.

Next, the intra prediction unit 230 is provided to read the reference pixels from the picture storing unit 260 so as to generate the intra prediction block and judge whether or not the unavailable reference pixels exist.

The above-mentioned judgment may be carried out based on the actual presence of the reference pixels which are used to generate the intra prediction block in such a way to employ the decoded intra prediction mode of the current block.

Next, the intra prediction unit 230 may generate the reference pixels a the unavailable positions by using the previously recovered available reference pixels if it needs to generate the reference pixels.

The definition on the unavailable reference pixels and the method for generating the reference pixels are same as the operation in the intra prediction unit 150 illustrated in FIG. 1, provided that it is possible to selectively recover only the reference pixels which are used to generate the intra prediction block based on the decoded intra prediction mode of the current block.

Next, the intra prediction unit 230 will judge whether or not the filter is applied to the reference pixels so as to generate the prediction block. More specifically, the intra prediction unit 230 may determine, based on the decoded intra prediction mode and the size of the current prediction block, whether or not the filtering will be applied to the reference pixels so as to generate the intra prediction block of the current block.

The problem of the blocking artifact may become more serious if the size of the block increase, whereupon it is possible to increase the number of the prediction mode to filter the reference pixels as the size of the block increases. If the size of the block increases larger than a predetermined size, the block may be judged as a flat region, so the reference pixels may not be filtered in an effort to reduce any complexity.

If it is judged that the filter should be applied to the reference pixels, the reference pixels may be filtered using the filter.

Two or more filters may be adaptively employed based on a step difference between the reference pixels. It is preferred that the filter coefficients of the filter are symmetrical.

Moreover, two or more filters may be adaptively employed based on the size of the current block. More specifically, if the filter is employed, a filter having a narrow bandwidth may be applied to a small block, and a filter having a wider bandwidth may be applied to a large block.

In case of the DC mode, since the prediction block can be generated with an average value of the reference pixels, it does not need to employ the filter. If the filter is employed, an unnecessary computational burden may increases.

Moreover, it does not need to employ the filter to the reference pixels in the vertical mode wherein the video has a correlation in the vertical direction. It does not also need to employ the filter to the reference pixels in the horizontal mode where the video has a correlation in the horizontal direction.

Since the actual application of the filtering is related to the intra prediction mode of the current block, the reference pixels can be adaptively filtered based on the intra prediction mode of the current block and the size of the prediction block.

Next, the prediction block can be generated using the reference pixels or the filtered reference pixels in accordance with the recovered intra prediction mode. Since the generation of the prediction block is same as the operation in the coder, the description thereon will be omitted. Since the generation in case of the planar mode is also same as the operation in the coder, the description thereon will be omitted.

Next, whether or not the generated prediction block will be filtered is judged. The judgment of the filtering may be carried out using an information included in the slice header or the coding unit header. It may be determined based on the intra prediction mode of the current block.

If it is judged that the generated prediction block should be filtered, the generated prediction block will be filtered. More specifically, a new pixel can be generated by filtering the pixels at a predetermined position of the prediction block generated using the available reference pixels neighboring with the current block.

The aforementioned method may be applied when generating the prediction block. For example, in the DC mode, the prediction pixels contacting with the reference pixels among the prediction pixels may be filtered using the reference pixels contacting with the prediction pixels.

In this way, the prediction pixels are filtered using one or two reference pixels based on the position of the prediction pixel. The filtering of the prediction pixel in the DC mode may be applied to all the sizes of the prediction blocks. In the vertical mode, the prediction pixels contacting with the left side reference pixels among the prediction pixels of the prediction block may be changed using the reference pixels except for the upper side pixels which are used to generate the prediction block.

In the same way, in the horizontal mode, the prediction pixels contacting with the upper side reference pixels among the generated prediction pixels may be changed using the reference pixels except for the left side pixels which are used to generate the prediction block.

In this way, the current block can be recovered using the prediction block of the recovered current block and the residual block of the decoded current block.

The video bitstream according to an embodiment of the present invention is a unit which can be used to store the coded data in one picture and may include a PS (Parameter Sets) and a slice data.

The PS may be split into a picture parameter set (hereinafter, referred to "PPS") which is a data corresponding to the header of each picture, and a sequence parameter set (hereinafter, referred to "SPS"). The PPS and SPS may include an initialization information which may be used to initialize each coding.

The SPS is a common reference information which may be used to decode all the coded pictures and may include the maximum number of the pictures available for a profile and a reference, and the size of the picture. It may be configured as in FIG. 6 and FIG. 7.

The PPS is a reference information for decoding pictures with respect to each picture which has been coded by a RAU (Random Access Unit) and may include the kinds of variable length coding methods, an initial value of a quantization step, and a plurality of reference pictures. It may be configured as in FIG. 8 and FIG. 9.

Meanwhile, a SH (Slice Header) may include an information with respect to a corresponding slice when coding the slice unit, and it may be configured as in FIG. 10 to FIG. 12.

The configuration for coding and decoding videos using a plurality of the processing units will be described.

According to an embodiment of the present invention, the device for processing videos may include a video central processing unit which is configured to communicate with a host and parse a parameter information or a slice header information from a video data inputted from the host, and a plurality of video processing units which are able to process the videos based on the parsed information in accordance with a control of the video central processing unit. Each of the video processing units may include a first processing unit which is able to carry out an entropy coding with respect to the video data while communicating with the video central processing unit, and a second processing unit which is able to process, for each coding unit, the video data with respect to which the entropy coding has been carried out.

The parameter information may include a VPS (Video Parameter Set) information, a SPS (Sequence Parameter Set) information, and a PPS (Picture Parameter Set) information.

Moreover, the first processing unit is able to deduct a coding tree unit, a coding unit, a prediction unit, and a transform unit parameter information and is able to transmit them to the second processing unit.

Furthermore, the second processing unit is able to process any of a TQ (Transform/Quantization), an intra prediction, an inter prediction, a LF (Loop Filtering), and a memory compression, which is carried out in such a way that the video data with respect to which the entropy coding has been carried out are used as a coding unit.

Here, the device for processing videos may be a VPU 300 which will be described later, the video central processing unit may be a V-CPU 310 which will be described later, and the video processing unit may be a V-Core 320 which will be described later. Moreover, the first video processing unit may be a BPU 321 which will be described later, and the second video processing unit may be a VCE 322 which will be described later.

Moreover, if the video central processing unit communicates with the host per unit of the picture, and the parallel process is carried out, the communication may be carried out in the raster scan sequence with the first processing unit based on the CTU unit. For example, the video central processing unit 310 (V-CPU) is able to communicate, per unit of the CTU row, with the first processing unit.

Furthermore, according to an embodiment of the present invention, the device for processing videos may further include a prescan controller 400 which is able to generate prescan information per-scan segment unit in such a way to prescan the video data inputted from the host.

Here, a prescan module 400 is able to split the bitstream of the video data into a prescan segment unit based on the position of the CTU via the prescanning. Moreover, the prescan module 400 is able to generate and store the prescan information corresponding to the split position in such a way to carry out a bitstream parsing and a simplified entropy decoding (for example, a CABAC processing for extracting only the prescan information).

The prescan information stored by the prescan module 400 may correspond to the position which has been split per unit of the prescan segment and may include at least one of a CABAC engine information, context information, a bitstream offset information, a CTU position information, a Qp information and an additional information. The addition information may include, for example, at least one of an error information, and an error command information.

Moreover, the prescan segment unit may mean a unit which is split to process the tile or slice per unit of the CTU row. The prescan segment unit, therefore, may be determined based on a position where each tile/slice starts, a boundary position between tile and slice, or a boundary position between the $1^{st}$ CTU and tile in each CTU row. The information on a split position corresponding to the prescan segment unit may be expressed by a CTU position information and a bitstream offset information.

The prescan module 400 is able to generate and align the tasks in a simple raster scan sequence in such a way to provide a splitting function of the prescan segment unit unless the V-CPU 310 is dependent on the tile/slice unit. Moreover, even each V-Core 320 may carry out a seamless decoding based on the previously stored prescan information even through the tasks are allocated per unit of the CTU row by the V-CPU 310. Furthermore, any unbalance can be removed, which may occur due to a size difference between the tile and slice of the processing amounts of a plurality of the processing units, and it is possible to inhibit the reduction in the bandwidth efficiency due to the unbalance.

Meanwhile, the V-CPU 310 may adjust the operation timing at a frame or picture level and control the output in such a way to control the operation of the prescan module 400 and the synchronization between the V-Cores 320.

Moreover, the V-CPU 310 is able to asynchronously control and process the picture decoding start time and the picture decoding completion time in consideration of the prescan module 400. As the asynchronous control method, there is a method wherein a decoding start time of the second picture, which corresponds to the next picture, is allocated to an intermediate portion between the decoding start time of the first picture and the decoding completion time of the first picture. In this case, since the overhead which may add tasks to each V-Core may be hidden, the processing performance can be enhanced.

As an asynchronous control method, there is a method wherein a decoding start time of the second picture, which corresponds to the next picture, is allocated to an intermediate portion between the decoding start time of the first picture and the decoding completion time of the first picture. In this case, since the overhead which made add tasks to each V-Core may be hidden, the processing performance can be enhanced.

Moreover, as another asynchronous control method, there is a method wherein a prescan time with respect to a first picture and a task allocation (reordering) time are controlled to overlap each other. In this case, the V-CPU 310 is able to control each V-Core 320 to carry out the decoding in such a way to instantly allocate the task corresponding to a row if the CTU prescans one row. In this case, since the latency can be lowered, it may be usefully applied to a network display.

In particular, if the picture to be processed includes a tile, and the tile thereof is split into columns, the latency of the ordinary decoding may be very high. According to an embodiment of the present invention, since the prescan, however, is carried faster as compared to the decoding, it is possible to obtain an effect wherein the latency can be lowered during the whole decoding procedures.

Moreover, as another asynchronous control method, there is a method wherein the decoding time of each V-Core 320 is overlapped with the decoding start time of the next second picture after the first picture has been prescanned, and the task has been allocated. For example, the V-CPU 310 is able to control the decoding start time (which may be same as the prescan start time) to be allocated before the decoding completion time of the first picture. In this case, the V-CPU 310 can limit the change of the instance so as to prevent any loss in the performance. For example, the V-CPU 310 may control the instance change to be allowed only before the decoding start (pinrun) of the second picture, which corresponds to the next picture, is executed after the decoding completion (pindone) of the first picture has been done.

Meanwhile, here, the device for processing videos may include a device for coding videos and a device for decoding videos. As illustrated in FIG. 1 to FIG. 4, the video decoding device and the video coding device may be formed of a device which is able to carry out inverse procedures. For this reason, only the video decoding device will be representatively described for the sake of simple description. This description is not limited thereto. The video coding device can be implemented with the video coding device which is able to carry out the inverse procedure of the video decoding device which will be described later.

Figure 13:
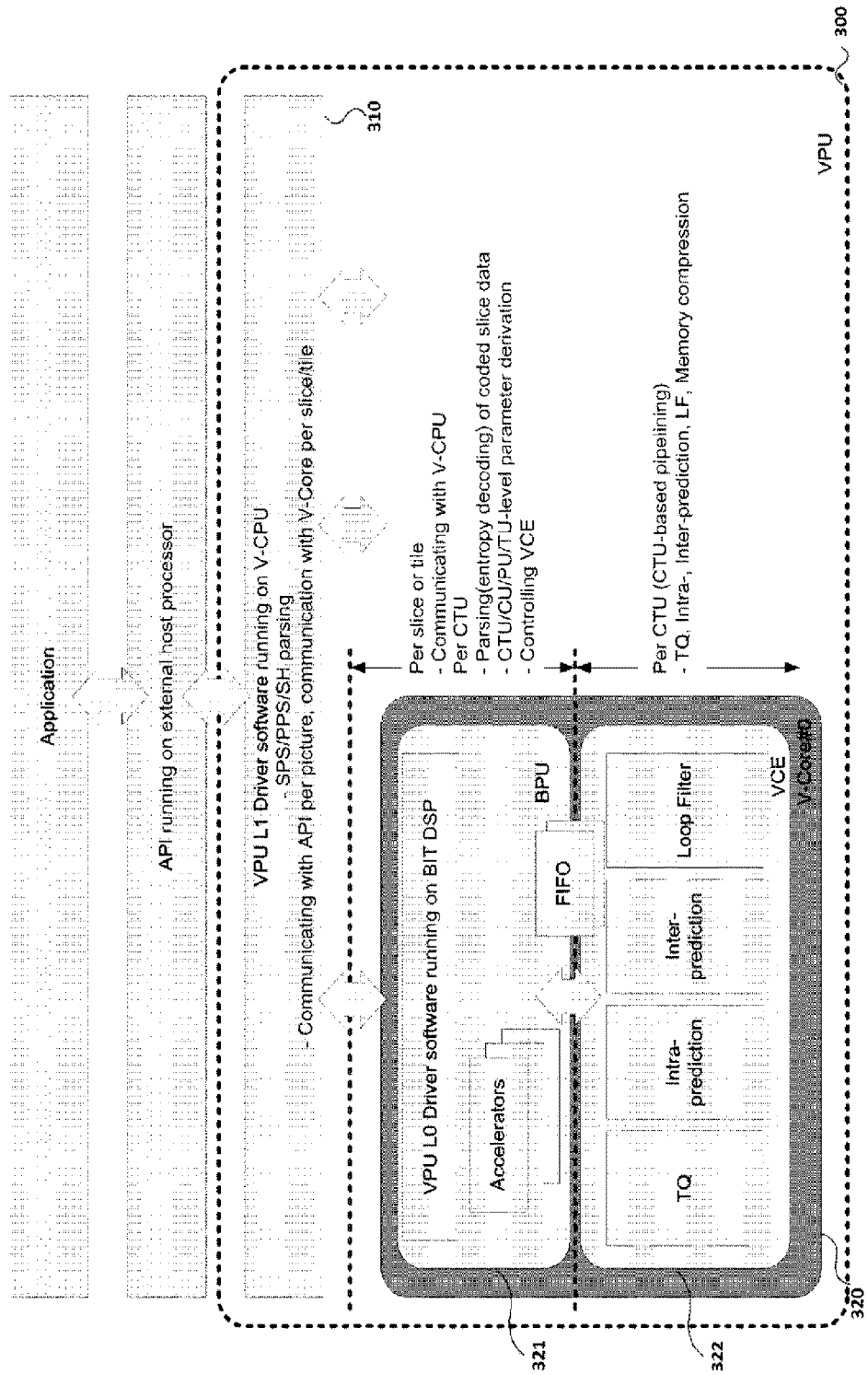
FIG. 13 is a view illustrating a layer structure of a video decoder unit according to an embodiment of the present invention.

FIG. 13 is a view illustrating a layer structure of a video decoding device according to an embodiment of the present invention. Referring to FIG. 13, the video decoding device may include a VPU (Video Processing Unit) 300 which is able to carry out a video decoding function, and the VPU 300 may include a V-CPU (Video Central Processing Unit) 310, a BPU 321, and a VCE 322. The BPU 321 and the VCE 322 may be combined into a V-Core 320. The VPU 300 may further include a prescan module 400 which will be described later.

Here, the VPU 300 according to an embodiment of the present invention may preferably include one V-CPU 310 and a plurality of V-Cores 320 (hereinafter refereed to Multi V-Core), but it is not limited thereto. The numbers thereof may change based on the implementation types of the VPU 300.

The V-CPU 310 is provided to control the whole operations of the VPU 300. In particular, the V-CPU 310 may parse a VPS (Video Parameter Set), SPS, PPS and SH in the received video bitstream. Moreover, the V-CPU 310 may control the whole operations of the VPU 300 based on the parsed information.

As an example, the V-CPU 310 may control the prescan information to be stored in such a way to transmit a video bitstream to the prescan module 400. The V-CPU 310 is able to generate a task that each V-Core 320 should process based on the parsed information. If the WPP (Wavefront Parallel Processing) or the virtual WPP according to an embodiment of the present invention is employed, each task may correspond to the CTU row unit data of the video bitstream.

Moreover, the V-CPU 310 may judge the number of the V-cores 320 which will be used for the data parallel processing based on the parsed information. As a result of the judgment, if it is judged that the data parallel processing requires a plurality of the V-Cores 320, the V-CPU 310 may determine a region that each V-Core 320 among the multi V-Cores 320 should process.

Furthermore, the V-CPU 310 may determine a start position (an entry point) of the bitstream with respect to the region which will be allocated to each V-Core 320 via the tasks.

In addition, the V-CPU 310 may allocate, to the multi V-Cores 320, a boundary region in one picture which has been formed due to the decoding carried out using the multi V-cores 320.

Here, the V-CPU 310 is able to communicate, per unit of the picture, with the API (Application Programming Interface) and is able to communicate, per unit of the CTU row, with the V-Core 320. Moreover, the V-CPU 310 is able to communicate per unit of the slice/tile.

The V-Core 320 will carry out a decoding processing and a boundary processing in accordance with a control of the V-CPU 310. As an example, the V-Core 320 is able to decode the allocated region in accordance with a control of the V-CPU 310. In addition, the V-Core 320 is able to carry out a boundary processing with respect to the allocated boundary region in accordance with a control of the V-CPU 310.

Here, the V-Core 320 may include a BPU 321 and a VCE 322.

The BPU 321 is provided to entropy-decode the data of the allocated region (a CTU row unit, a slice or a tile). More specifically, the BPU 321 is able to carry out a part of the function of the entropy decoding unit 210, and the BPU 321 is able to deduct a CTU (Coding Tree Unit)/CU (Coding Unit)/PU (Prediction Unit)/TU (Transform Unit) level parameter and is able to control the VCE 322.

Here, the BPU 321 is able to communicate with the V-CPU 310 per unit of the CTU row and per unit of the slice and tile and is able to communicate with the VCE 322 per unit of the CTU.

The VCE 322 is able to carry out a TQ (Transform/Quantization), Intra prediction, Inter prediction, LF (Loop Filtering), and a memory compression by receiving the deducted parameter of the BPU 321. More specifically, the VCE 322 may carry out the functions of the inverse quantization/inverse change unit 220, the deblocking filter 250, the intra prediction unit 230, and the motion compensation prediction unit 240.

Here, the VCE 322 is able to process the data with a CTU-based pipelining with respect to the allocated region.

More specifically, the V-CPU 310 is able to carry out an interface operation with the host processor. The V-CPU 310 is able to parse a VPS (Video Parameter Set)/SPS (Sequence Parameter Set)/PPS (Picture Parameter Set)/SH (Slice Header) in the received video bitstream.

Moreover, the V-CPU 310 is able to control the prescan information to be stored in an additional memory in such a way to transmit the received video bitstream to the prescan module 400.

Furthermore, the V-CPU 310 is able to transmit an information, which is necessary for the decoding at the V-core 320 with the aid of the parsed information. Here, the necessary information may include a "picture parameter data structure" and a "slice control data structure".

The "picture parameter data structure" may include the following information. As an example, it may include the information in the sequence/picture header (for example, a picture size, a scaling list, CTU, min/max CU sizes, min/max TU sizes, etc.) and the position (an address) of the buffers when the frame decoding is necessary.

This picture parameter data structure can be set once during the decoding of one picture.

The slice control data structure may include the following information. As an example, it may include an information included in a slice header (for example, a slice type, a slice/tile region information, a reference picture list, a weighted prediction parameter, etc.).

The slice control data structure may be set when the slice changes. The inter-processor communication register or slice parameter buffer at an external memory of the V-Core 320 may store an N-number of slice control data structures. If not a full state, it is able to previously store the structure even though the structure is not a data structure corresponding to the slice which is currently being subjected to the decoding. Here, "N" may be determined based on the condition where the time that the V-Core 320 informs the V-CPU 310 of the completion of the processing is set after when the pipe of the VCE 322 has been completely flushed (N=1) or the condition where the pipelining should be maintained between the currently processed segment and the next segment (N>1).

Here, the information transmitted from the V-CPU 310 to the V-Core 320 may be transmitted via the inter processor communication register of the V-Core 320. The inter processor communication register may be implemented with a register array (a file) having a fixed size or an external memory. If it is implemented with the external memory, it may be configured in a structure wherein the V-CPU 310 stores in the external memory and the BPU 321 reads from the external memory.

Meanwhile, even though the number of the slice control data structures that the V-Core 320 is able to store is one (or any number), the V-CPU 310 should seamlessly carry out the SH decoding and the parameter generation so as to prevent the V-Core 320 between the segments from being in an idle state.

Meanwhile, if one slice includes a plurality of tiles and can be processed in parallel by the multi V-Cores 320, the V-CPU 310 is able to transmit the same slice control data structure to the multi V-Cores 320.

Moreover, when an exception occurs at the V-Core 320, the V-CPU 310 is able to process the exception. As an example, if an error is detected during the decoding of the parameter set, an error is detected while the BPU 321 of the V-Core 320 decodes the slice data, and the set decoding time has passed during the frame decoding (for example, an unknown error in the VPU 300, and if the peripheral of the V-CPU 310 and the V-Core 320 are stalled due to the error in the system bus), the V-CPU 310 is able to carry out a predetermined measure so as to resolve such errors.

Moreover, the V-CPU 310 may report the completion to the API when the frame decoding of the VPI 300 is completed.

In particular, the V-CPU 310 may control the synchronizations of the multi V-Cores 320 so as to process in parallel the data of the multi V-cores 320. The virtual WPP (Wavefront Parallel Processing) processing can be made available with the aid of the configuration and operation of the V-CPU, which will be described later.

The V-CPU 310 is able to judge the number of the V-cores 320 which will be used for the data parallel processing based on the parsed information. As a result of the judgment, if it is judged that the data parallel processing requires a plurality of the V-Cores 320, the V-CPU 310 may determine a region that each V-Core 320 of the multi V-cores 320 should process.

Moreover, the V-CPU 310 may determine a start position (an entry point) of the bitstream with respect to a region which will be allocated to each V-core 320.

Furthermore, the V-CPU 310 may allocate to the multi V-Cores 320 a boundary region in one picture which has occurred due to the decoding which is carried out using the multi V-Cores 320.

Meanwhile, the BPU 321 is able to entropy-decode the data in the allocated region. Since the SH (Slice Header) has been decoded by the V-CPU 310, and all the necessary information have been received by the picture parameter data structure, and the slice control data structure, the BPU 321 may not decode the SH.

Moreover, the BPU 321 may deduct the CTU (Coding Tree Unit)/CU (Coding Unit)/PU (Prediction Unit)/TU (Transform Unit) level parameters.

Furthermore, the BPU 321 may transmit the deducted parameter to the VCE 322.

Here, the information (for example, a picture size, a segment offset/size . . . ) which are commonly used for each block, and the CTU/CU/PU/TU parameters, a coefficient, a reference pixel data, which are necessary for the decoding except for the source/destination address, etc. of the DMAC, can be transmitted via the FIFO, provided that the parameters of the segment level can be set by the internal register of the VCE 322, not by the FIFO.

Moreover, the BPU 321 is able to carry out the function of the VCE controller which may control the VCE 322. The VCE controller may output a picture_init, a segment_init signal, and a software reset that the BPU 321 is able to control based on a resister setting, and each sub-block of the VCE 322 can use these signals for the sake of a control.

If the BPU 321 sets the aforementioned picture/segment level parameters at the VCE controller and orders a segment run (by a register setting), the decoding procedure can be controlled referring to the fullness of the CU parameter FIFO and a state information of each sub-block without having any communication with the BPU 321 until the decoding of the set segment is completed.

Moreover, if any exception occurs, the BPU 321 is able to process the exception, and if the slice/tile segment processing is completed, the BPU 321 may report it to the V-CPU 310.

The VCE 322 may receive the deducted parameters of the BPU 321 and carry out the TO (Transform/Quantization), Intra prediction, Inter prediction, LF (Loop Filtering), and memory compression.

Here, the VCE 322 is able to process the data with the aid of the CTU-based pipelining with respect to the allocated region.

According to the above-described various embodiments of the present invention, there may be further provided a V-CPU 310 which is able to carry out the work distribution and synchronization with respect to the multi V-cores in such a way to separate the header parsing and the data processing process, and pipeline the separated data processing process.

Figure 14:
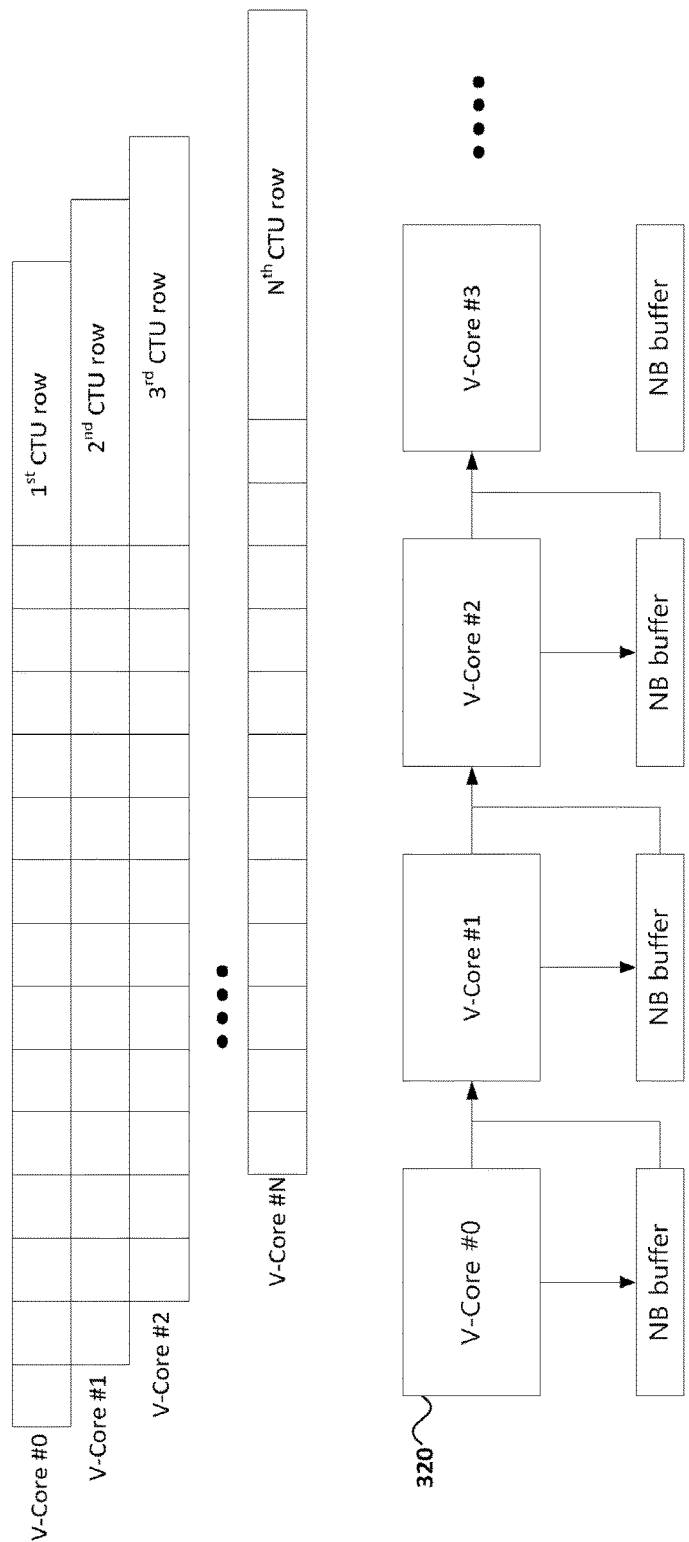
FIG. 14 is a timing diagram for describing a video decoding operation of a video central processing unit according to an embodiment of the present invention.

FIG. 14 is a timing diagram illustrating a synchronization control of the V-Core for the sake of a WPP video decoding of the video central processing unit (V-CPU) 310 according to an embodiment of the present invention.

Referring to FIG. 14, the V-CPU 310 of the video decoding device according to an embodiment of the present invention is provided to generate a plurality of tasks for the sake of a parallel processing based on the header information parsed from the bitstream and the information prescanned by the prescan module 400 and is able to allocate in sequence a plurality of the tasks to each V-Core 320.

Each V-Core 320 is able to carry out a decoding in accordance with the parsed header information and the prescan information via the operations of the BPU 321 and the VCE 322.

As illustrated in FIG. 14, the V-CPU 310 may generate a plurality of tasks with respect to one V-Core 320 or an N-number of the V-Cores 320 in such a way to split each CTU per unit of the row and may transmit to each V-Core 320.

More specifically, the V-Core 320 #0 may receive an allocation of $1^{st}$ CTU row from the V-CPU 310 and transmit a neighbor data generated during the decoding procedure of the currently processed CTB to a NB (Neighbor Block) buffer. For this, the BPU 321 and the VCE 322 may generate from the currently processed CTB the information which is necessary for each neighbor block decoding, and transmit to the NB buffer.

If the data transmission to the NB buffer is completed, the BPU 321 or the VCE 322 may transmit the position information of each corresponding CTB to the V-Core 320 #1.

Moreover, the V-Core 320 #1 may receive an allocation of the $2^{nd}$ CTU row from the V-CPU 310 and process per unit of the CTB. In particular, for the sake of the WPP, the V-core 320 #1 may receive from the NB buffer the decoding data with respect to the CTB which has been already processed at #0.

Furthermore, the V-Core 320 #1 is able to decode the $2^{nd}$ CTU row per unit of the CTB based on the position information of the CTB received from the V-Core 320 #0 and the decoding information of the previously processed CTB stored in the NB buffer.

In the same way, the V-Core 320#1 is able to transmit to the NB (Neighbor Block) the neighbor data generated during the decoding procedure of the currently processed CTB. If the data transmission to the NB buffer is completed, the BPU 321 or the VCE 322 of the V-Core 320 #1 may transmit the position information of each corresponding CTB to the V-Core 320 #2.

Since the aforementioned procedure is carried out in sequence until #N based on the number of the V-Cores 320, the decoding procedure with respect to the whole CTUs can be efficiently processed in parallel. If the decoding of the whole CTUs corresponding to the picture is completed, the V-CPU 310 may output the video data of the decoded picture to the host processor via the API.

The V-CPU 310 is able to carry out the multi core parallel coding, which is using the WPP, with respect to all the bitstreams. In this case, the V-CPU 310 is able to control the decoding of each V-Core 320 to be carried out all the time after the prescan has been carried out with respect to the bitstream. Moreover, the V-CPU 310 may determine whether or not the prescan is carried out in such a way to parse the header of the video bitstream.

As an example, the V-CPU 310 may omit the prescan operation if it is possible to recognize that the encoding has been carried out in the WPP method, based on a predetermined syntax element parsed at the PPS. In this case, the V-CPU 310 may generate a task corresponding to each V-Core 320 in the WPP method in such a way to even use only the parameter information which is basically parsed from the bitstream.

Moreover, if it is judged that the encoding has been carried out using the tile/slice unit based on the synthetic element parsed at the PPS, the V-CPU 310 may carry out the prescan by controlling the prescan module 400, and each V-Core 320 can carry out the WPP decoding based on the prescan information.

The prescan module 400 will be described below in more detail, which is provided to carry out the prescan in accordance with a control of the V-CPU 310.

Figure 15:
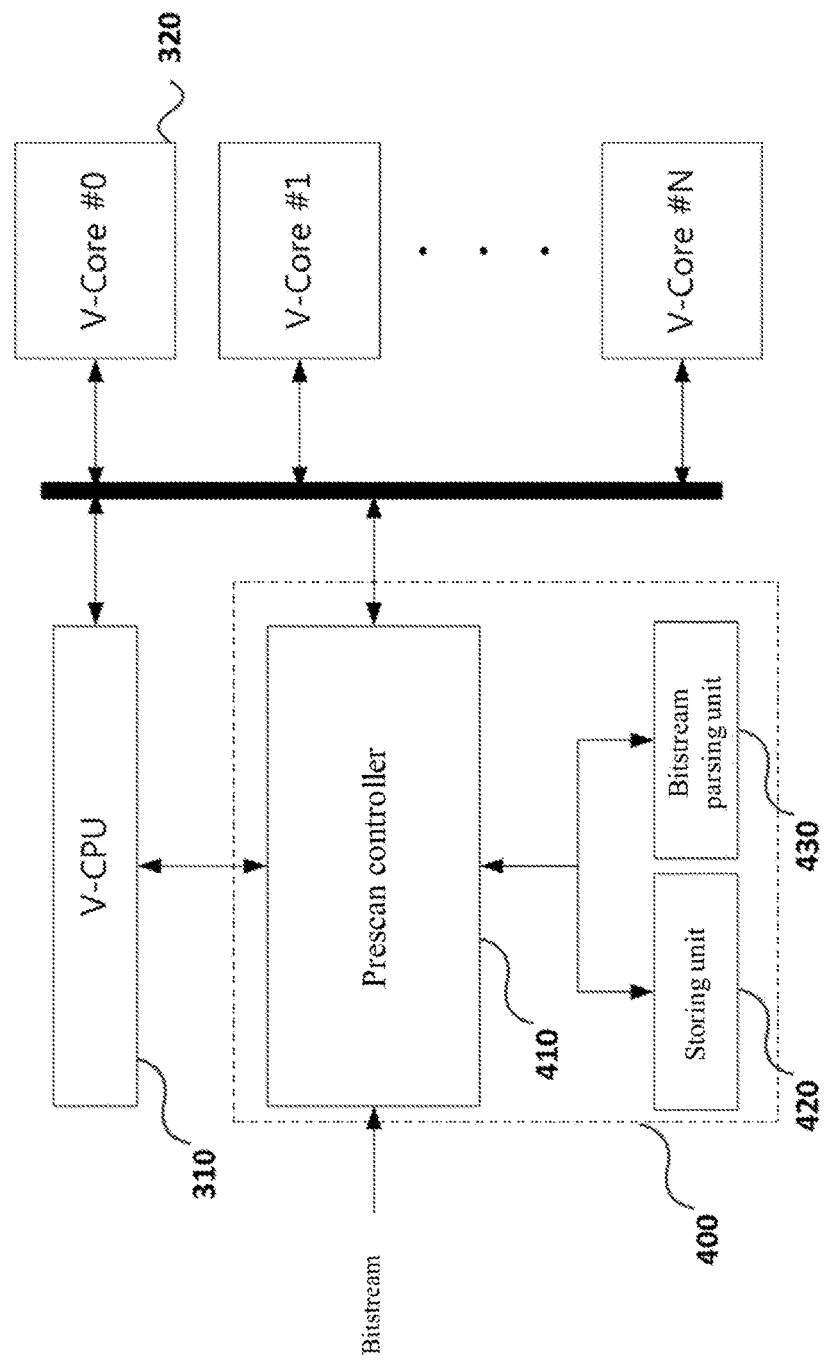
FIG. 15 is a block diagram for describing a prescan module according to an embodiment of the present invention.

FIG. 15 is a block diagram for describing the prescan module 400 according to an embodiment of the present invention.

The prescan module 400 according to an embodiment of the present invention may include, but is not limited to, a prescan controller 410, a storing unit 420, and a bitstream parsing unit 430.

The prescan controller 410 is provided to carry out the whole controls of the prescan module 400 in accordance with a control of the V-CPU 310. The prescan controller 410 is able to receive a bitstream for each video processing unit, generate prescan information based on the information parsed by the bit-stream parsing unit 430, and carry out the operation for storing the generated prescan information in the storing unit 420. The video processing unit received via the prescan controller 410 may be a picture or frame unit.

Moreover, the bitstream parsing unit 430 may receive a bitstream of the frame unit and can parse the basic information to form prescan information.

In order to form the prescan information, the bitstream parsing unit 430 is able to extract header information of the bitstream corresponding to the prescan target frame and is able to parse the tile/slice information of the frame from the header information. Moreover, the bitstream parsing unit 430 is able to obtain a CTU structure information of the prescan target frame from the header of the bitstream.

In particular, the bitstream parsing unit 430 is able to parse any of position information corresponding to a predetermined block designated by the prescan controller 410 among the whole frames forming the CTU, engine information of an entropy coder, context information and a Qp value information. The position information may include an offset information corresponding to a predetermined bit.

For this, the bitstream parsing unit 430 may include at least one entropy decoder. The entropy decoder, not illustrated, may include, for example, a CABAC decoder for a prescan.

More specifically, the prescan CABAC decoder of the bitstream parsing unit 430 basically is able to carry out a CABAC decoding processing, and is also able to carry out an operation for extracting any of engine information required for a prescan, context information and a Qp information. The prescan CABAC decoder may be different from an entropy decoder (a CABAC processor) which is included for the V-Core 320 to decode videos.

In this way, The prescan CABAC decoder of the bitstream parsing unit 430 may not carry out other operations, except for the operation for extracting the prescan information, for example, the operations for buffering or transmitting the data (for example, a MVD value) which are decoded to cooperate with another processor which is able to decode. The CABAC entropy decoding speed for the sake of a prescan of the bitstream parsing unit 430 may be much faster than the CABAC decoding speed for the sake of the video decoding of the V-Core 320.

Meanwhile, the prescan controller 410 is able to generate prescan information based on the basic information extracted by the bit-stream parsing unit 430 and store in the storing unit.

The prescan information which will be stored may include necessary information for the V-core 320 to seamlessly carry out the video decoding of the CTU row unit.

In particular, if a tile/slice boundary occurs while a predetermined CTU row is decoded in sequence, the right block of the boundary may correspond to another tile/slice, the decoding is not available by the conventional method.

For this reason, the prescan information may include at least one among a boundary position information (an offset information) of the tile/slice included in the CTU, engine information (a CABAC engine information, etc.) of the block corresponding to the boundary, context information of the block corresponding to the boundary, and a Qp value information of the block corresponding to the boundary.

Moreover, the decoding is available with only the engine initialization information at the start point of the tile/slice. Since the initialization time is faster than the memory access time, the context information, etc. may not separately stored. If the CTU row includes a start block (a start point) of the tile/slice, the prescan information may include only the position information corresponding to the start point thereof, and engine initialization information.

Meanwhile, since the V-core 320 should carry out a decoding processing per unit of the CTU row for the sake of the WPP, the prescan information may include at least one among position information corresponding to the start block of the CTU row, engine information (a CABAC engine information, etc.) of the block corresponding to the boundary, context information of the block corresponding to the boundary, and a Qp value information of the block corresponding to the boundary. More specifically, the information which will be stored, may be a CABAC engine status, a probability context, a bitstream offset, a CTU position info, Qp, etc.

Moreover, the prescan information may include an additional information. The additional information may include, for example, an error information or an error command information. The V-CPU 310 or the V-Core 320 is able to previously judge if an error may occur during the decoding based on the prescan information, and is able to previously take a predetermined action for the error.

Furthermore, the prescan controller 410 may remove an overlapping information in such a way to separate the prescan information with the aid of the context index and can efficiently store in the storing unit 420.

As an example, the prescan controller 410 may split the CTU into a plurality of prescan segment blocks which are split based on the boundary block of the tile/slice and the start block of the CTU row, and it can allocate a context index to each prescan segment block.

Moreover, the prescan controller 410 may store in the storing unit 420 the context index thereof, the CABAC engine information corresponding to the prescan segment block thereof, the context information, the offset information, the Qp value information, etc. and may efficiently manage the same. The engine initialization information may be just implied based on where or not the context index information is present.

Meanwhile, the storing unit 420 may include an internal buffer and an external memory. The internal buffer is able to temporarily store the context information corresponding to the aforementioned prescan segment block. The internal buffer may include one or more buffers for storing the context information corresponding to the prescan segment block.

If the context information corresponding to more than a predetermined number of the prescan segment blocks is stored in the internal buffer, the stored data may be transmitted to the external memory via the DMA. In addition, the storing unit 420 may communicate with the V-CPU 310 and the V-Core 320 and can transmit prescan information. The prescan segment block data may be managed using a software via the FIO.

Meanwhile, the V-CPU 310 may use a part of the prescan information for the sake of a task scheduling, and the V-Core 320 may use a unit thereof for the sake of the video decoding of the tile/slice boundary or the CTU row.

Since the prescan information is transmitted to each V-Core 320, the V-core 320 is able to seamlessly carry out the decoding at the tile/slice boundary, whereupon each V-Core 320 can carry out the decoding per unit of the CTU row.

Moreover, the V-CPU 310 is able to generate a CTU row unit task of a raster scan sequence based on the prescan information, and the CTU row unit task can be allocated in sequence to the V-Core. For this reason, the task generation and the aligning time therefore can be reduced, so it does not need to consider the tile/slice size effects, whereby the number of the V-cores and the overhead with respect to the sequence allocation can be reduced.

Furthermore, since each Core 320 can process the data only per unit of the CTU row, an input and output latency between the V-CPU 310 and the V-Core 320 and between the V-CPU 310 and the host processor can be reduced, and since the V-Core 320 is able to recognize the video bitstream as the WPP stream wherein the tile/slice structure does not exist, the unnecessary works can be additionally removed, which may result in an efficient WPP operation.

Figure 16:
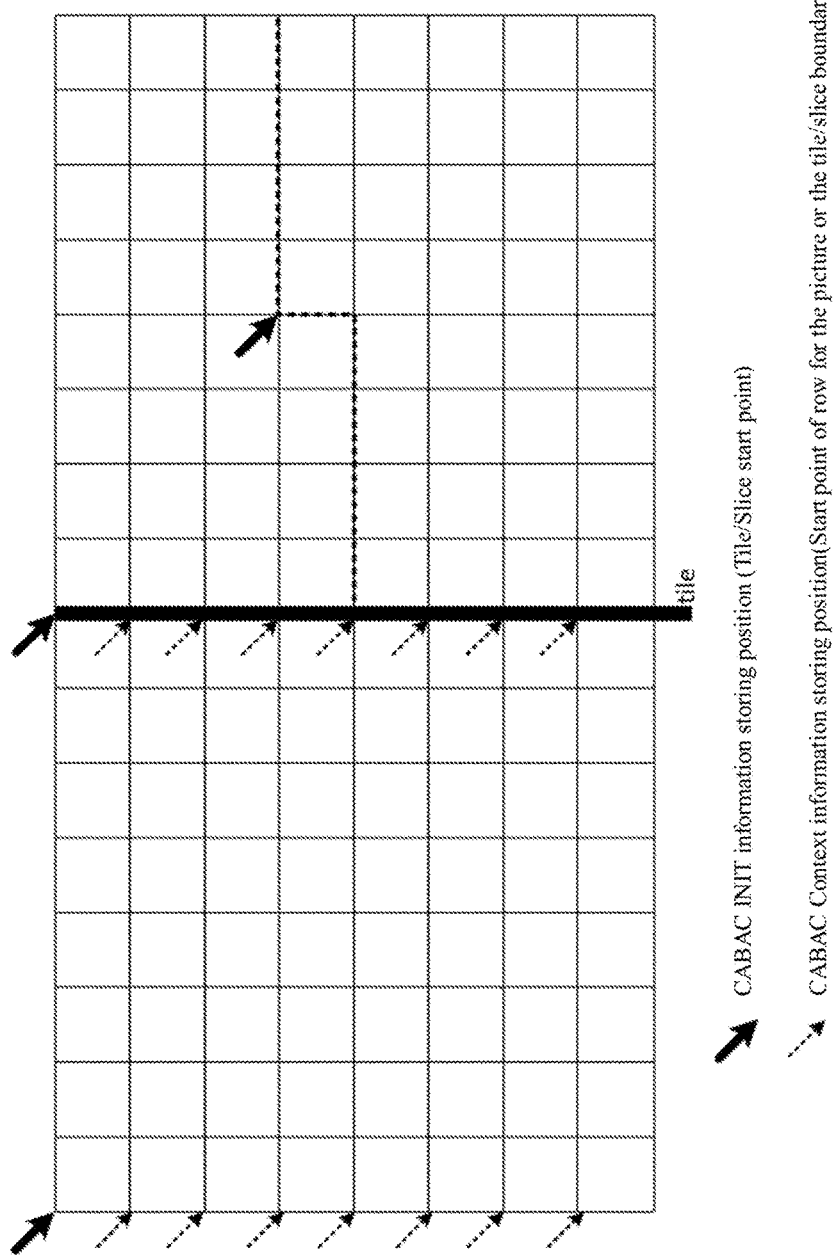
FIG. 16 is a block diagram for describing an information which is prescanned by a prescan module according to an embodiment of the present invention.

FIG. 16 is a block diagram for describing in detail the information which is prescanned with the aid of the prescan module according to an embodiment of the present invention.

Referring to FIG. 16, the prescan module 400 is able to store prescan information in response to a predetermined position among the blocks which form the CTU. The storing of the prescan information may mean the storing of the whole engines and context information or may mean the storing of only the initialization information.

As illustrated in FIG. 16, when the tile/slice starts, the prescan module 400 may store only the initialization information (for example, a CABAC INIT information) corresponding to the start point for the sake of efficient processing. In this case, the information which will be stored, may be position information (a CTU address information, a NAL address information or an offset information) in the bitstream corresponding to the start point and a context index corresponding to the prescan segment.

Moreover, the prescan module 400 may store the prescan information corresponding to the right block at the boundary of the tile/slice. In this case, the prescan information may include a CABAC engine information, context information, a Qp information and other information necessary for the next block decoding. Here, the information which will be stored, may include position information (a CTU address information, a NAL address information or an offset information) in the bitstream of the right block at the boundary of the tile/slice.

The storing format of the prescan information may has the following structure.

```
typedef struct
{
uint16_t start_ctu_addr_x;
uint16_t start_ctu_addr_y;
uint16_t end_ctu_addr_x;
uint16_t end_ctu_addr_y;
uint32_t start_nal_addr;
uint32_t end_nal_addr;
uint8_t rbsp_offset;
uint8_t reserved;
int16_t context_idx;
} segment_t;
```

In particular, according to this structure, when the end block of the prescan segment is updated, the context_idx can be updated together. At this time, the prescan segment may include the first block of the CTU row, and if the first block is the start point (the first CTB) of the independent slice or if it corresponds to the start point (the first CTB) of the tile, the context-idx may have an invalid value.

In this way, according to the prescan information structure according to an embodiment of the present invention, if the context_idx is not the first ctb of the row (in the tile/slice), it will not have a valid value, and an implication on the initialization may be given.

According to this embodiment, since the first CTB of the slice or tile is able to initialize the contexts only with the information of the bitstream, the processing efficiency can be enhanced in such a way to validly process the context_idx which is indicating the backed-up context, without backing up an additional context.

Figure 17:
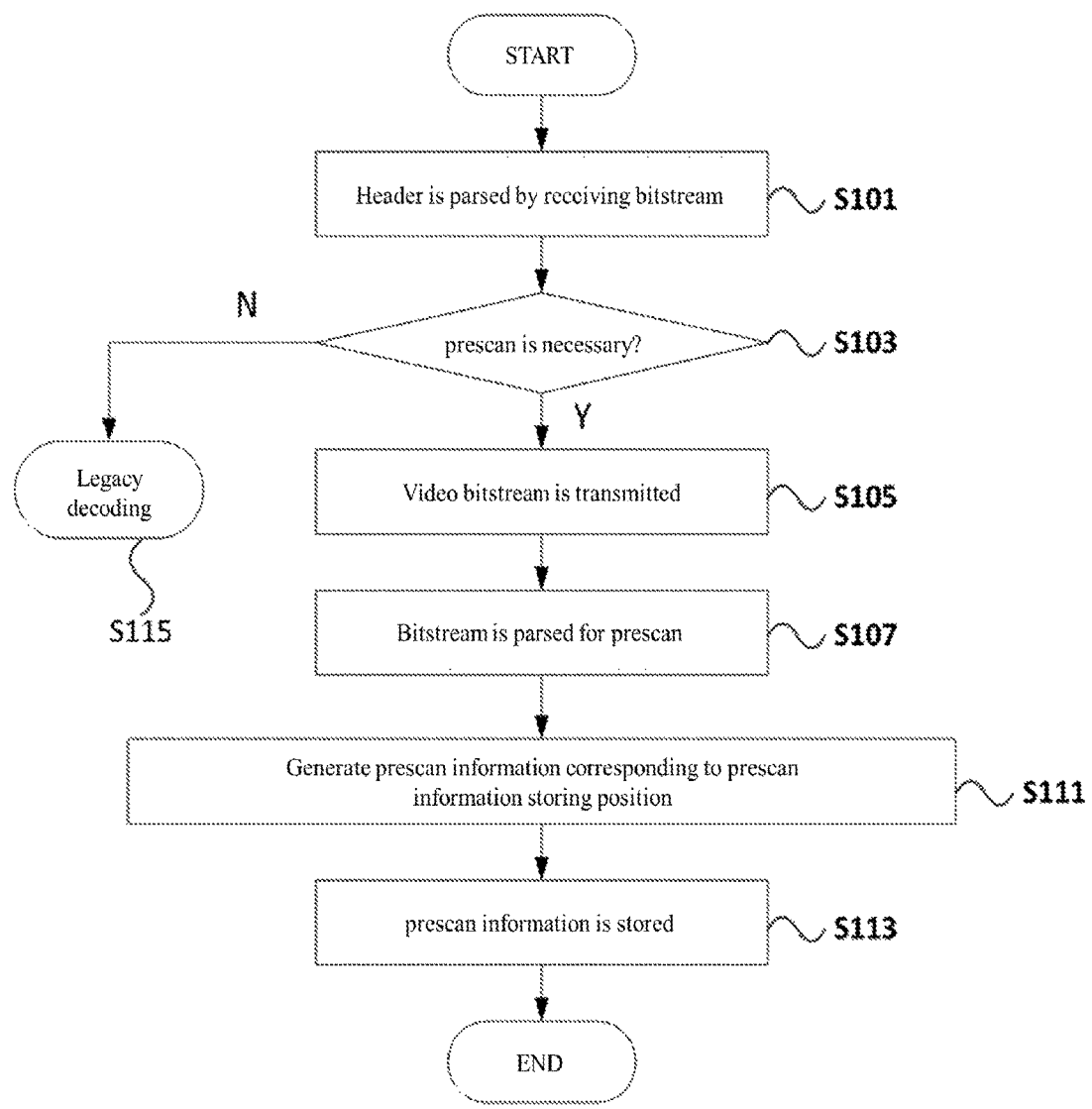
FIG. 17 is a flow chart for describing an operation of a prescan module according to an embodiment of the present invention.

FIG. 17 is a flow chart for describing the whole operations of the prescan module 400 according to an embodiment of the present invention.

First, the V-CPU 310 will receive a video bitstream and parse the header (S101) and will judge whether or not the bitstream requires a prescan (S103).

As described above, the V-CPU 310 is able to judge, based on the parsed header, whether or not the video bitstream has been already encoded by the WPP method. The V-CPU 310 may parse a flag showing any presence of the tile/slice from the PPS and then judge whether or not the bitstream has been encoded by the WPP method.

If the prescan is not necessary, the V-CPU 310 will carry out a decoding by the conventional method in cooperation with the V-Core 320 (S115).

Meanwhile, if the prescan is necessary, the prescan module 400 will receive a video bit-stream in accordance with a control of the V-CPU 310 (S105) and parse the bitstream for the prescan (S107). Here, the prescan controller 410 may allow to parse the basic information for the prescan in such a way to control the bit-stream parsing unit 430. With the aid of a unitially simplified CABAC processing, the prescan module 400 may parse a CTU structure for the prescan, a CABAC engine information, and context information.

The prescan module 400 will generate prescan information in response to the block which will store the prescan information (S111), and store it in the storing unit (S130).

As mentioned above, the prescan information may be stored corresponding to the first block of the CTU row and the right block at the boundary of the tile/slice. The prescan information which will be stored, may include at least one among position information of the block, engine initialization information, engine information, context information, and a Qp information.

FIG. 18 to FIG. 21 are views illustrating the prescan information which are generated during the operation of the prescan module according to an embodiment of the present invention.

Based on the structure of the previously described prescan information, the prescan module 400 will classify the CTU into prescan segments which will be designated as context_idx and store the prescan information with respect to each prescan segment. The prescan segment may mean a block group which is split by the boundary of the slice/tile and the boundary of the CTU row.

In particular, since the capacity of the internal buffer of the storing unit 420 is limited, if the stored prescan segments are over a predetermined number, the prescan module 400 will transmit the information stored in the buffer to an external memory through the dma operation.

Moreover, when the prescan is completed, the prescan module 400 may output to the V-CPU 310 the number of the prescan segments, etc. together with a prescan completion message.

Figure 18:
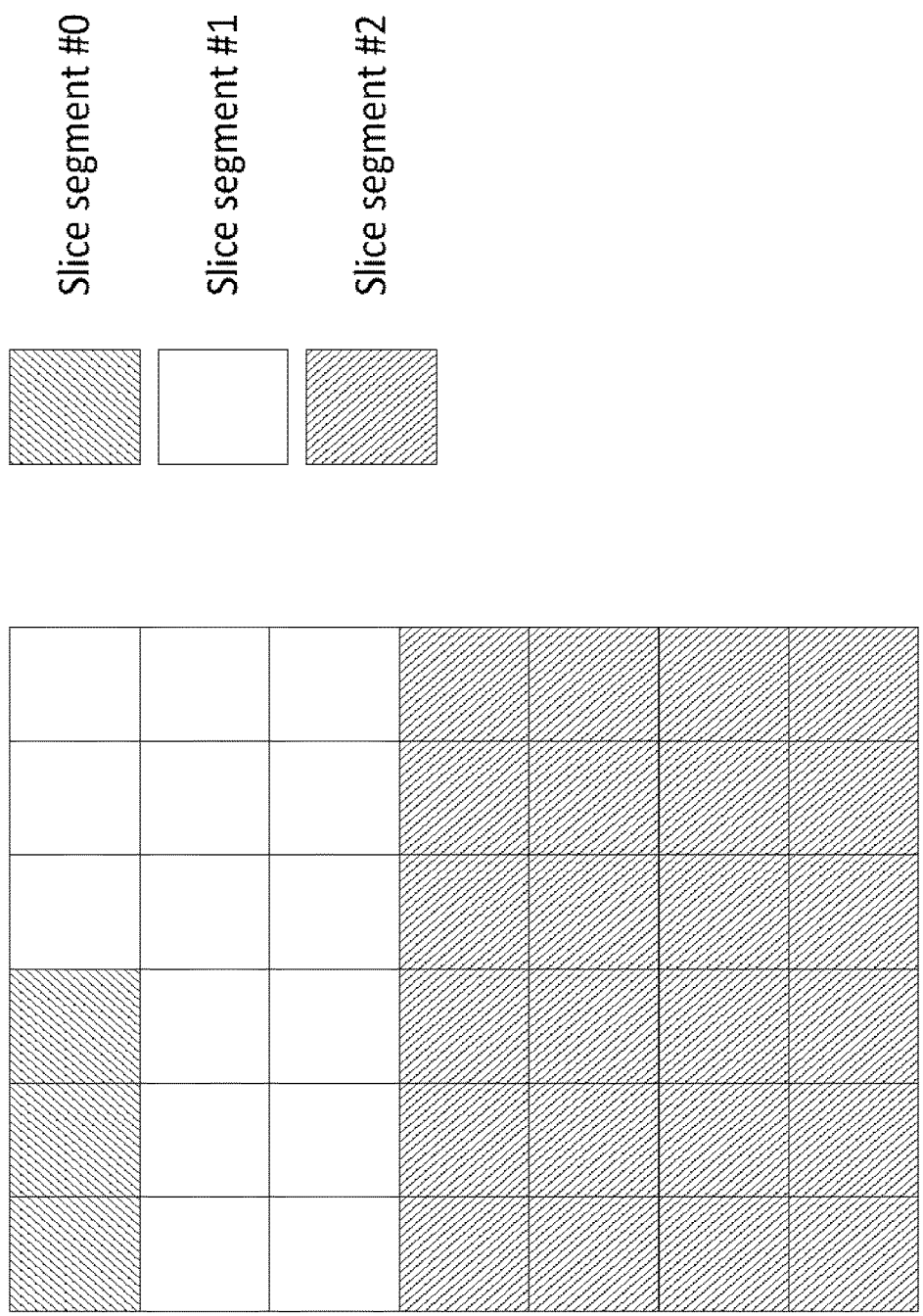
FIG. 18 to FIG. 21 are views for describing prescan information which is generated via an operation of a prescan module according to an embodiment of the present invention.

First, FIG. 18 illustrates that the CTU of the frame which is the target of the prescan, is formed of three slices.

The first slice may correspond to Slice Segment #0, and the second slice may correspond to slice Segment #1, and the third slice may correspond to slice Segment #2. This embodiment illustrates that the CTU blocks are formed of only the slices, but it is obvious to a person having ordinary skill in the art that the same or similar operations can be applied even when the CTU blocks are formed of the tile/slice.

Figure 19:
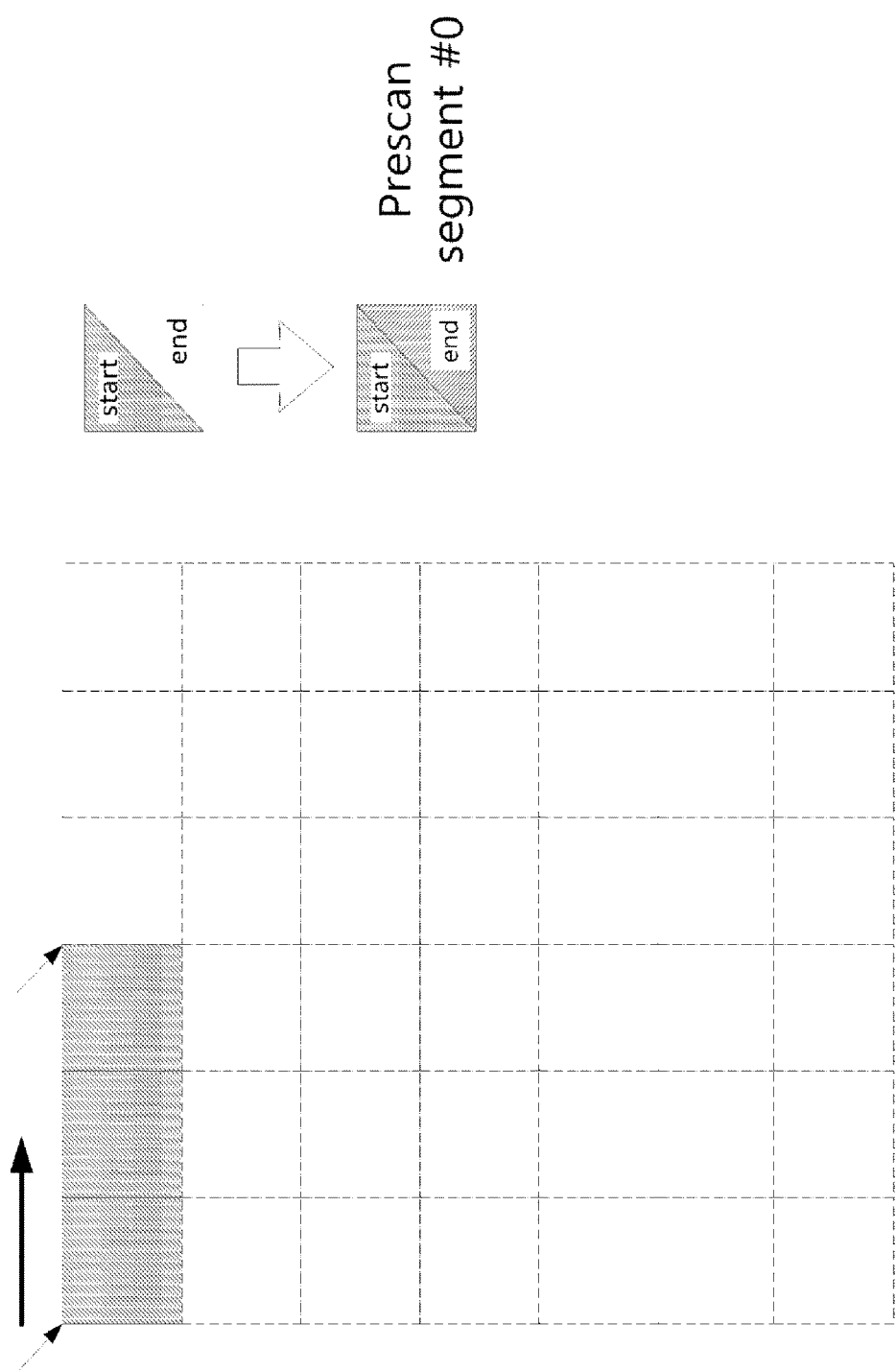

FIG. 19 illustrates a procedure wherein the prescan information of Slice Segment #0 is extracted and stored.

As illustrated in FIG. 19, the prescan module 400 may store the position information corresponding to the start block of Slice Segment #0 and the engine initialization information and may store the position information corresponding to the last block in response to the prescan segment #0.

Figure 20:
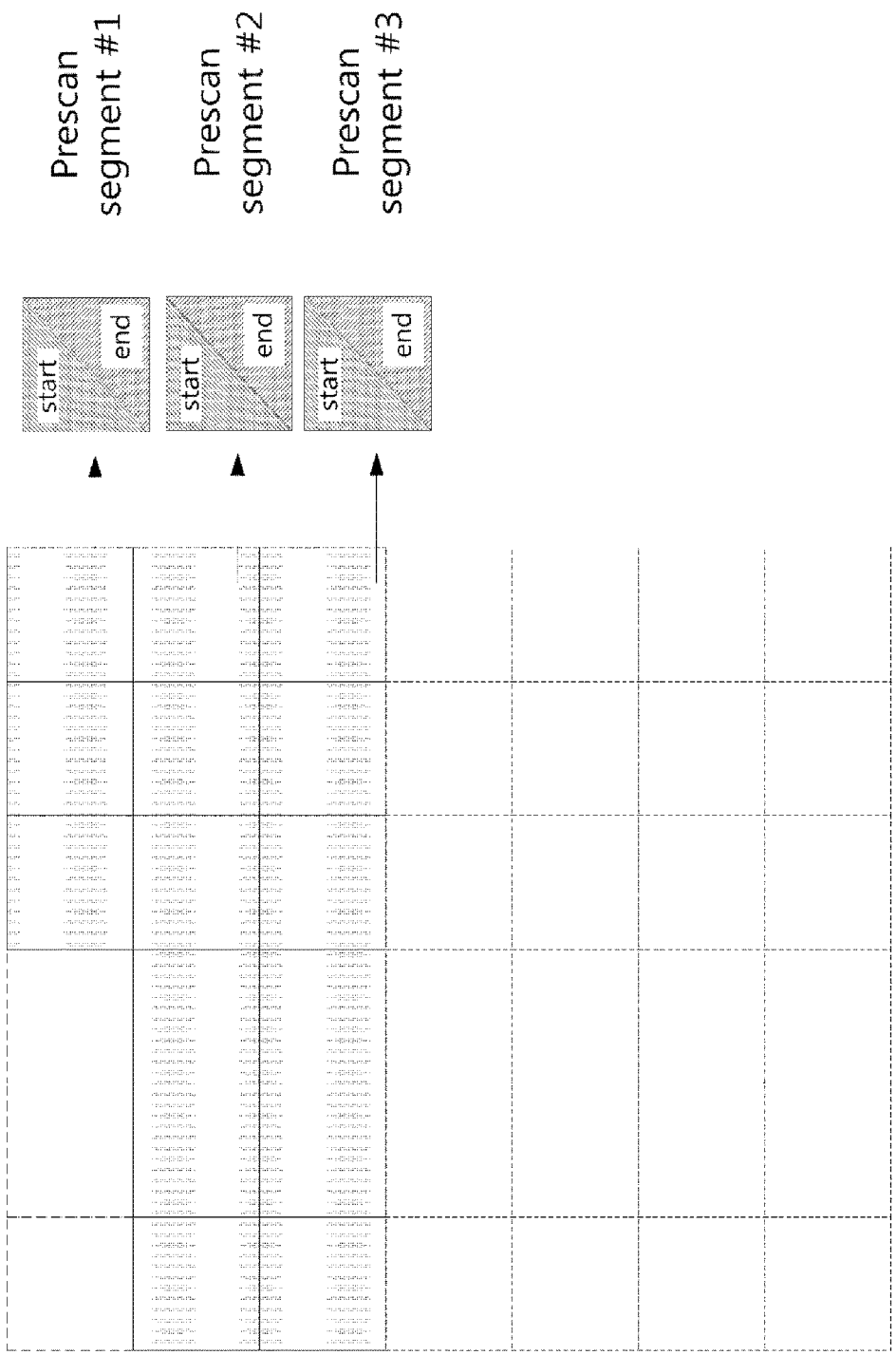

Next, FIG. 20 illustrates a procedure for extracting and storing the prescan information of Slice Segment #1.

As illustrated in FIG. 20, the prescan module 400 may store position information corresponding to the start block of the slice of Slice Segment #1 and the engine initialization information and may store position information corresponding to the last block of CTU row #0 in response to the prescan segment #1.

Next, the prescan module 400 may store, in response to the prescan segment #2, position information corresponding to the start block of CTU row #1, an engine/context/Qp information corresponding to the block, and position information corresponding to the last block of CTU row #1.

Next, the prescan module 400 may store, in response to a prescan segment #3, position information corresponding to CTU row #2, an engine/context/Qp information corresponding to the block, and position information corresponding to the last block of CTU row #2.

Figure 21:
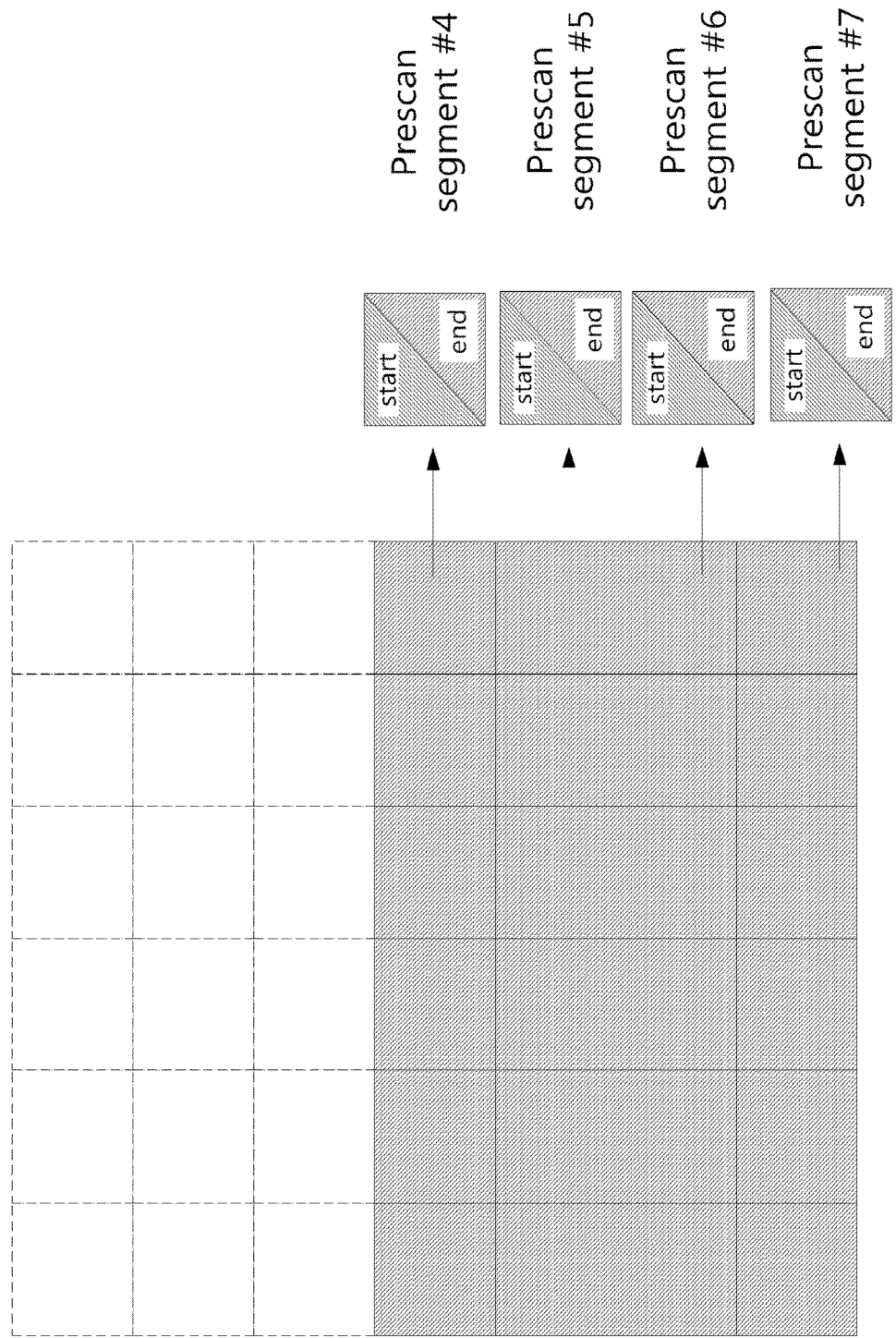

As the next steps, FIG. 21 illustrates a procedure for extracting and storing the prescan information of Slice Segment #2.

As illustrated in FIG. 21, the prescan module 400 may store a position corresponding to the start block of Slice Segment #2 and engine initialization information, and may store, in response to a prescan segment #4, position information corresponding to the last block of CTU row #3.

Next, the prescan module 400 may store, in response to a prescan segment #5, position information corresponding to the start block of CTU row #4, an engine/context/Qp information corresponding to the block, and position information corresponding to the last block of CTU row #4.

Next, the prescan module 400 may store, in response to a prescan segment #6, position information corresponding to the start block of CTU row #5, an engine/context/Qp information corresponding to the block, and position information corresponding to the last block of CTU row #5.

Next, the prescan module 400 may store, in response to a prescan segment #7, position information corresponding to the start block of CTU row #6, an engine/context/Qp information corresponding to the block, and position information corresponding to the last block of CTU row #6.

Meanwhile, if the prescan segment is over a predetermined number in the course of the aforementioned procedure, the prescan module 400 may output a previously stored information to the external memory via the dma operation and may carry out an operation for emptying the internal buffer.

According to the aforementioned embodiment of the present invention, the prescan information can be efficiently generated and processed with the aid of the prescan module 400. Moreover, the decoding unit 300 is able to carry out the decoding per unit of the CTU row based on the prescan information split into the prescan segment units irrespective of the tile/slice structure of the bitstream. A plurality of the processing units, for example, the V-Cores 320, are able to seamlessly carry out the WPP parallel processing without any tile/slice dependency. The prescan module 400 will parse the bit-stream for the V-CPU 310 to carry out an efficient task scheduling, and may extract and store the information which is necessary and minimized, in order for each V-Core 320 to seamlessly carry out the entropy decoding.

Any processing performance unbalance among a plurality of the processing units, therefore, can be removed, and the bandwidth efficiency can be enhanced.

The method according to the present invention may be manufactured in the form of a program which is executable by the computer and stored in a recording medium that the computer can read. The recording medium that the computer can read may be any of ROM, RAM, CD-ROM, a magnetic tape, a floppy disk, an optical data storage, etc. It may be implemented in the form of a carrier wave (for example, a transmission via internet).

The recording medium that the computer can read, may include codes which are distributed in a network-connected computer system and that the computer can read in a distributed format, and the recording medium is executable. Moreover, a functional program, codes and code segments provided to implement the aforementioned method can be easily deducted by a programmer in the technical field to which the present invention belongs.

The invention has been described in detail with reference to preferred embodiments thereof. However, it will be appreciated by those skilled in the art that changes may be made in these embodiments without deuniting from the principles and spirit of the invention, the scope of which is defined in the appended claims and their equivalents.

What is claimed is:

1. A device for processing videos, comprising:
   a video central processing unit which is able to communicate with a host and is provided to receive a bitstream and parse header information and is able to generate a plurality of tasks for the sake of parallel processing;
   a prescan module which is provided to generate prescan information based on a predetermined parsed syntax element from the bitstream, and in response to the bitstream being determined to be not encoded in a parallel processing method, by prescanning the bitstream according to a simplified entropy decoding for extracting only initialization information, engine information or context information at a predetermined position for a parallel decoding processing irrespective of any encoding unit structure of the bitstream; and
   a plurality of video processing units which are provided to process a plurality of the tasks based on the parsed header information and the prescan information in accordance with a control of the video central processing unit.

2. The device of claim 1, wherein the prescan information includes position information with respect to one or more predetermined blocks included in a coding tree unit identified from the bitstream.

3. The device of claim 2, wherein the predetermined block corresponds to a start block of each row of the coding tree unit.

4. The device of claim 1, wherein the prescan information includes at least one between the engine information of an entropy coding and the context information with respect to one or more predetermined blocks included in the coding tree unit identified from the bitstream.

5. The device of claim 1, wherein if a block group of a predetermined unit is included in the coding tree unit identified from the bitstream, the prescan information includes engine initialization information corresponding to a start position of the predetermined unit block.

6. The device of claim 5, wherein the block group of the predetermined unit includes a block group of a tile or slice unit.

7. The device of claim 1, wherein the prescan module comprises:
   a bitstream parsing unit which is provided to entropy-decode a part of the bitstream for the sake of the prescan, and parse necessary information; and
   a prescan controller which is provided to generate prescan information based on the information parsed by the bitstream parsing unit.

8. The device of claim 1, wherein the prescan module comprises:
   an internal buffer which is able to buffer the prescan information per unit of a prescan segment; and
   an external memory wherein when a predetermined number of the prescan segments is accumulated in the internal buffer, prescan information corresponding to a predetermined number of the accumulated prescan segments is stored.

9. The device of claim 1, wherein the prescan module indexes the prescan information per unit of the prescan segment and stores it, and the prescan segment unit is split and formed based on the start block of the tile or slice included in a coding tree unit identified from the bitstream or the last block of each row of the coding tree unit.

10. A method for processing videos, the method comprising:

receiving a bitstream, parsing header information, and generating a plurality of tasks for parallel processing, by a video central processing unit communicating with a host;

generating, by a prescan module, prescan information based on a predetermined parsed syntax element from the bitstream, and in response to the bitstream being determined to be not encoded in a parallel processing method, by prescanning the bitstream according to a simplified entropy decoding for extracting only initialization information, engine information or context information at a predetermined position for a parallel decoding processing irrespective of any encoding unit structure of the bitstream; and processing, by a plurality of video processing units, a plurality of tasks on the basis of the prescan information and the parsed header information by receiving the control of the video central processing unit.

11. The method of claim 10, wherein the prescan information includes position information with respect to one or more predetermined blocks included in a coding tree unit identified from the bitstream.

12. The method of claim 11, wherein the predetermined block corresponds to a start block of each row of the coding tree unit.

13. The method of claim 10, wherein the prescan information includes at least one between the engine information of an entropy coding and the context information with respect to one or more predetermined blocks included in a coding tree unit identified from the bitstream.

14. The method of claim 10, wherein if a block group of the predetermined unit is included in the coding tree unit identified from the bitstream, the prescan information includes engine initialization information corresponding to a start position of the predetermined unit block.

15. The method of claim 14, wherein the block group of the predetermined unit includes a block group of a tile or slice unit.

16. The method of claim 10, wherein the generating the prescan information comprises:
  a step wherein a part of the bitstream is entropy-decoded by a bitstream parsing unit for the sake of a prescan, and necessary information is parsed; and
  a step wherein prescan information is generated based on the information parsed by the bitstream parsing unit.

17. The method of claim 10, wherein the step for generating the prescan information comprises:
  a step wherein the prescan information is buffered per unit of prescan segments; and
  a step wherein if a predetermined number of the prescan segments is accumulated in an internal buffer, prescan information corresponding to a predetermined number of the accumulated prescan segments is stored.

18. The method of claim 10, wherein the step for generating the prescan information comprises:
  a step wherein the prescan information is indexed per unit of prescan segments and is stored, wherein a prescan segment unit is split and formed based on a start block of a tile or slice included in the coding tree unit identified from the bitstream or a last block of each row of the coding tree unit.

19. A non-transitory recording medium which includes a program for executing in a computer the method of claim 10 and is readable by the computer.

* * * * *